US012639259B1

(12) United States Patent
Mehta et al.

(10) Patent No.: US 12,639,259 B1
(45) Date of Patent: May 26, 2026

(54) SEAMLESS STORAGE UNIT MIGRATION

(71) Applicant: Dell Products L.P., Round Rock, TX (US)

(72) Inventors: Viral Kirtikumar Mehta, JamKhambhalia (IN); Nachiket Vilasrao Ghorpade, Pune (IN); Vikas Chaudhary, Pune (IN); Donna Barry Lewis, Holly Springs, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/007,424

(22) Filed: Dec. 31, 2024

(51) Int. Cl.
  *G06F 16/11* (2019.01)
  *G06F 16/174* (2019.01)
  *G06F 16/178* (2019.01)
(52) U.S. Cl.
  CPC ........ *G06F 16/119* (2019.01); *G06F 16/1748* (2019.01); *G06F 16/178* (2019.01)
(58) Field of Classification Search
  CPC ... G06F 16/119; G06F 16/1748; G06F 16/178
  See application file for complete search history.

(56) References Cited

U.S. PATENT DOCUMENTS

| | | | |
|---|---|---|---|
| 11,550,666 B1* | 1/2023 | Gunda | ................. G06F 11/1453 |
| 2006/0129513 A1* | 6/2006 | Nakatani | ............... G06F 3/0647 |
| 2008/0235300 A1* | 9/2008 | Nemoto | ................ G06F 16/119 |
| 2013/0024634 A1* | 1/2013 | Shitomi | ................ G06F 16/185 |
| | | | 711/E12.002 |

* cited by examiner

*Primary Examiner* — Tyler J Torgrimson
(74) *Attorney, Agent, or Firm* — Staniford Tomita LLP

(57) ABSTRACT

An instruction is received to migrate a first storage unit at a first appliance to a second appliance, the instruction being received while receiving file IO associated with ingesting files from a client-side deduplication library into the first storage unit. Synchronization of a second storage unit at the second appliance with the first storage unit is started. Upon reaching a threshold level of synchronization, the client-side library is notified of the migration. The threshold level is less than a complete synchronization. The client-side deduplication library closes currently open files to flush pending data to the first storage unit and suspends file IO. After the suspension, the synchronization is completed and the client-side library is notified of the completion. The client-side library reopens the closed files to resume the file IO of the now opened files to the second storage unit.

18 Claims, 29 Drawing Sheets

Receive, at the client-side deduplication library and over the server-initiated communication channel, a notification about the first storage unit being migrated to the second data protection appliance
510

Preserve file and connection descriptors associated with currently open connections and files of the one or more files being ingested to prevent their reuse with files other than the one or more files being ingested
515

Close the currently open connections and files to flush pending data to the first storage unit
520

Suspend the file IO to the first storage unit
525

After the suspension of the file IO to the first storage unit, complete, by the deduplication server, the synchronization of the second storage unit
530

Send a notification over the server-initiated communication channel to the client-side deduplication library that informs the client-side deduplication library about the completed migration and directs the client-side deduplication library to the second storage unit at the second data protection appliance
535

Open connections to the second storage unit and reuse the connection descriptors that were preserved
540

Open the closed files to resume file IO to the second storage unit and reuse the file descriptors that were preserved
545

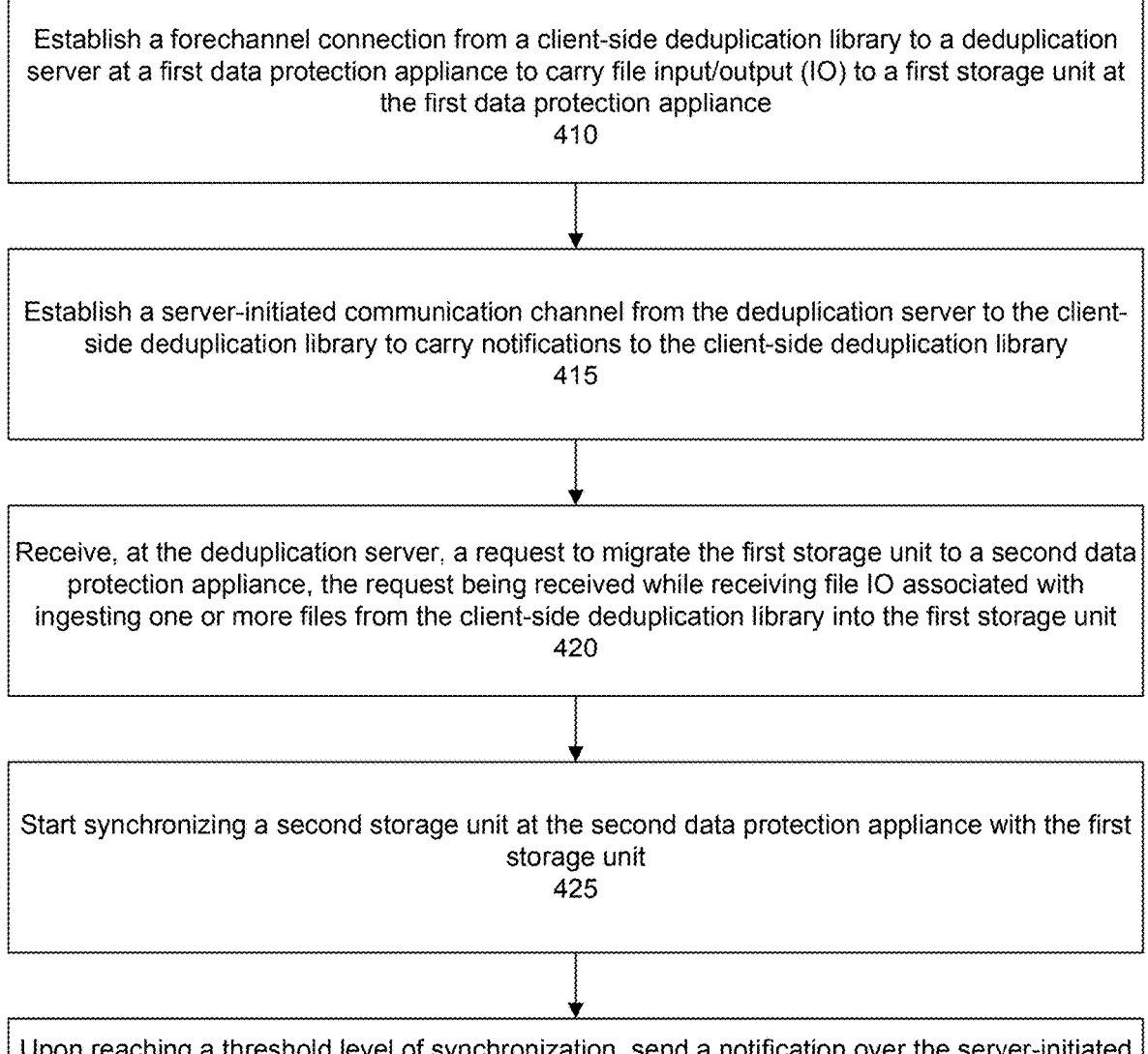

Establish a forechannel connection from a client-side deduplication library to a deduplication server at a first data protection appliance to carry file input/output (IO) to a first storage unit at the first data protection appliance
410

Establish a server-initiated communication channel from the deduplication server to the client-side deduplication library to carry notifications to the client-side deduplication library
415

Receive, at the deduplication server, a request to migrate the first storage unit to a second data protection appliance, the request being received while receiving file IO associated with ingesting one or more files from the client-side deduplication library into the first storage unit
420

Start synchronizing a second storage unit at the second data protection appliance with the first storage unit
425

Upon reaching a threshold level of synchronization, send a notification over the server-initiated communication channel to the client-side deduplication library that informs the client-side deduplication library about the migration, the threshold level of synchronization being less than a complete synchronization of the second storage unit with the first storage unit
430

FIG. 4

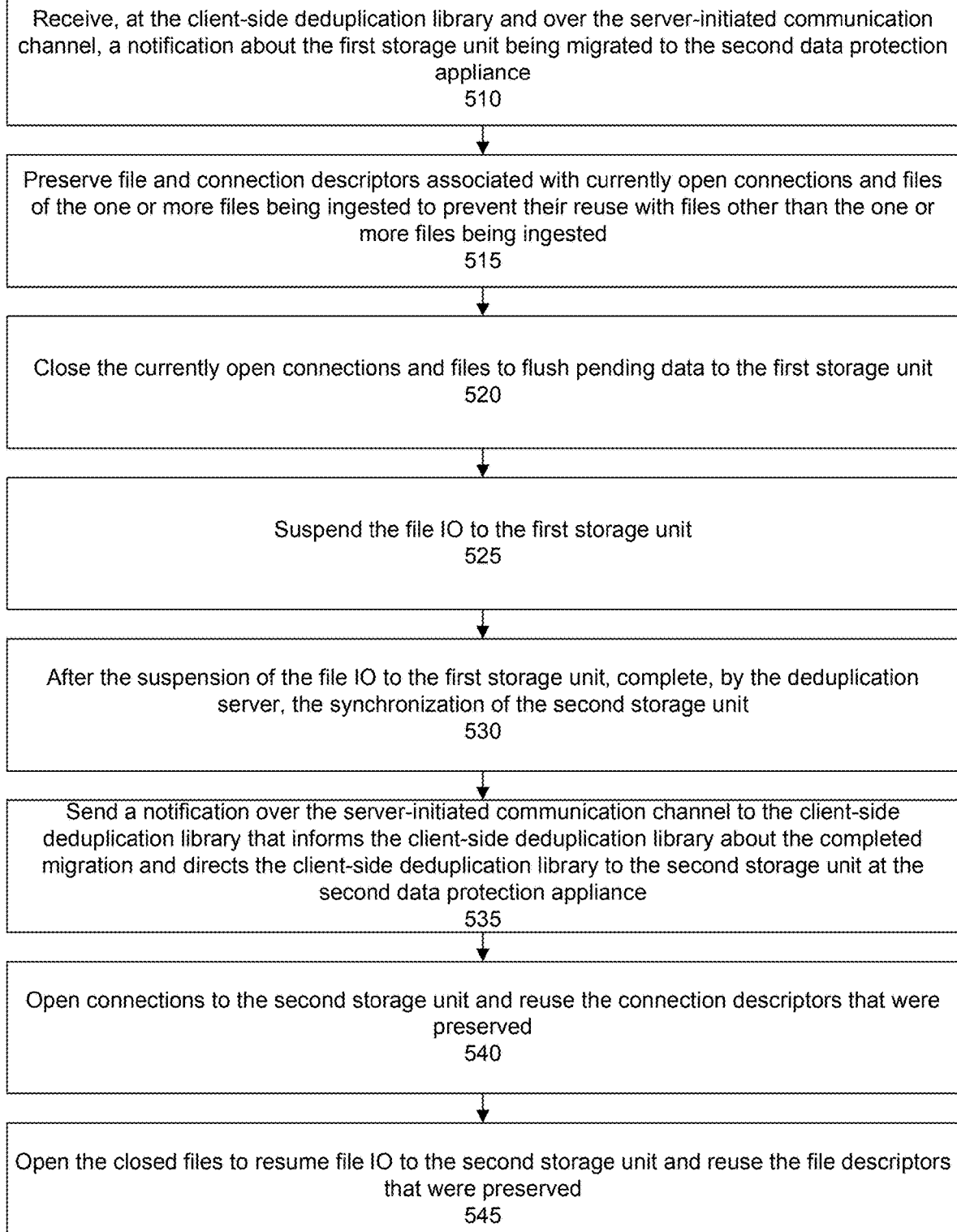

Receive, at the client-side deduplication library and over the server-initiated communication channel, a notification about the first storage unit being migrated to the second data protection appliance
510

Preserve file and connection descriptors associated with currently open connections and files of the one or more files being ingested to prevent their reuse with files other than the one or more files being ingested
515

Close the currently open connections and files to flush pending data to the first storage unit
520

Suspend the file IO to the first storage unit
525

After the suspension of the file IO to the first storage unit, complete, by the deduplication server, the synchronization of the second storage unit
530

Send a notification over the server-initiated communication channel to the client-side deduplication library that informs the client-side deduplication library about the completed migration and directs the client-side deduplication library to the second storage unit at the second data protection appliance
535

Open connections to the second storage unit and reuse the connection descriptors that were preserved
540

Open the closed files to resume file IO to the second storage unit and reuse the file descriptors that were preserved
545

FIG. 5

SEAMLESS STORAGE UNIT MIGRATION

CROSS-REFERENCE TO RELATED APPLICATIONS

This application is related to co-pending U.S. patent applications 19/007,401,filed Dec. 31, 2024; and 19/007, 418, filed Dec 31, 2024, and which are incorporated herein by reference for all purposes.

TECHNICAL FIELD

The present invention relates generally to information processing systems, and more particularly to large scale filesystems.

BACKGROUND

Companies rely on backup storage systems to safeguard critical business data from loss due to hardware failures, human error, natural disasters, cyberattacks, and so forth. Clients are the individual computers, servers, or devices that contain data to be backed up. The clients may run applications such as backup applications that identify data for backup to a backup appliance.

Occasionally, there may be a need to move a portion of data from the backup appliance to another backup appliance. For example, such a need may arise when the appliance is reaching its storage capacity limit. Moving the data, however, can be extremely disruptive to ongoing operations. There is a need for improved systems and techniques to reduce disruption to ongoing operations during the movement.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

An instruction is received to migrate a first storage unit at a first appliance to a second appliance, the instruction being received while receiving file IO associated with ingesting files from a client-side deduplication library into the first storage unit. Synchronization of a second storage unit at the second appliance with the first storage unit is started. Upon reaching a threshold level of synchronization, the client-side library is notified of the migration. The threshold level is less than a complete synchronization. The client-side deduplication library closes currently open files to flush pending data to the first storage unit and suspends file IO. After the suspension, the synchronization is completed and the client-side library is notified of the completion. The client-side library reopens the closed files to resume the file IO of the now opened files to the second storage unit.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 4 shows an overall flow of a first stage for migrating a storage unit, according to one or more embodiments.

FIG. 5 shows an overall flow of a second stage for migrating the storage unit, according to one or more embodiments.

DETAILED DESCRIPTION

Figure 1:
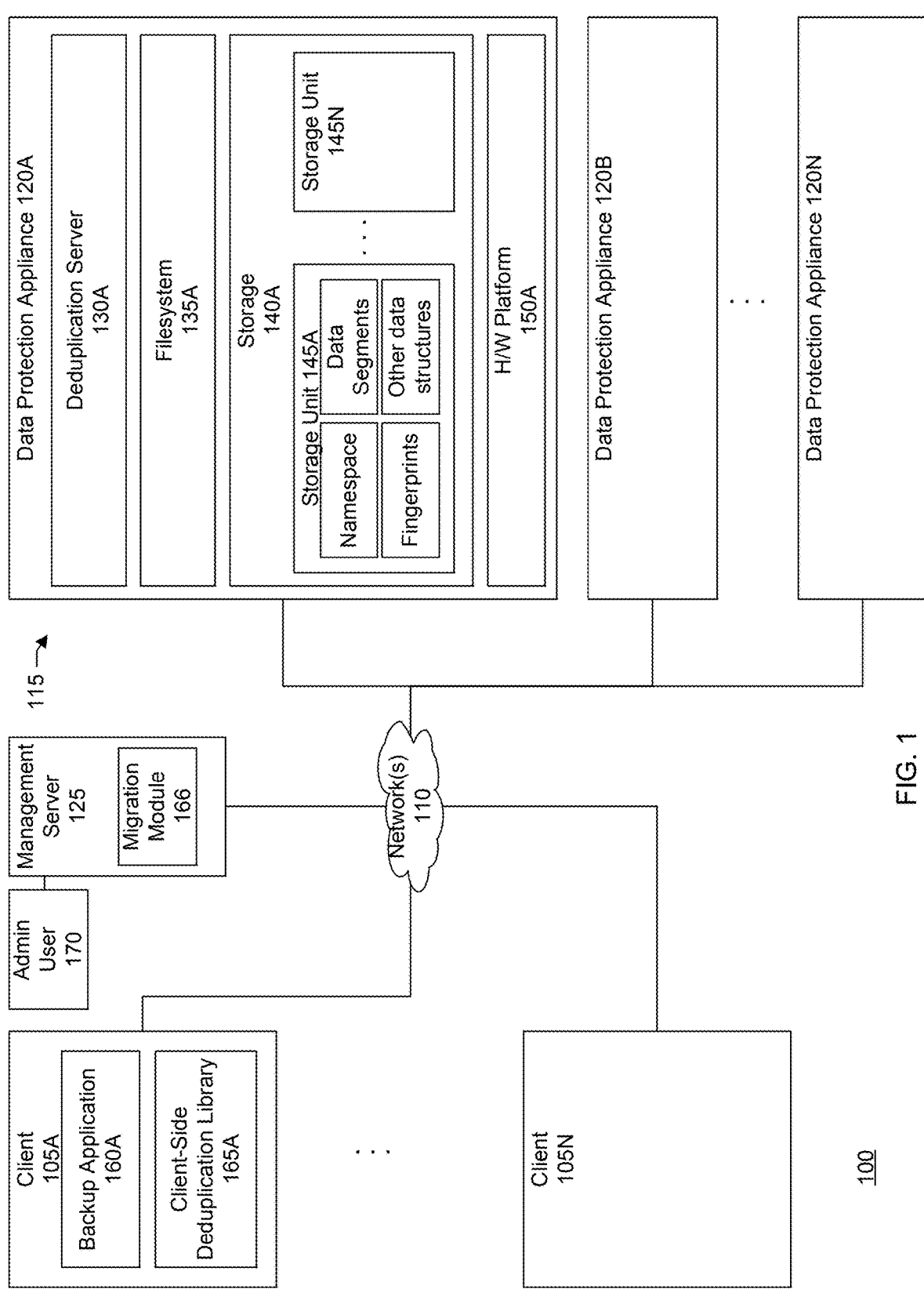
FIG. 1 shows a block diagram of an information processing system for performing a seamless migration of a storage unit, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a simplified block diagram of an information processing system 100 within which methods and systems for performing a seamless migration of a storage unit may be implemented. The example shown in FIG. 1 includes a set of clients 105A-N connected via a network 110 to a pool 115 of data protection appliances 120A-N. The pool of protection appliances are managed by a management server 125. Each data protection appliance, such as first data protection appliance 120A, includes a deduplication server 130A, deduplication filesystem 135A, storage 140A having storage units 145A-N, and is supported by an underlying hardware platform 150A. Each client, such as first client 105A, includes a backup application 160A and a client-side deduplication library 165A.

The clients may be referred to as backup clients. The data protection appliance provides a backup target for files and data generated by the clients. The data backed up to an appliance is stored in a storage unit. In an embodiment, when the backup application seeks to perform a filesystem operation, the backup application issues a call (e.g., application programming interface (API) call) to the client-side deduplication library to request the filesystem operation. The client-side deduplication library processes and forwards the request to the data protection appliance for fulfillment. The results of the request are returned by the data protection appliance to the client-side library which, in turn, passes the results back to the requesting client application. An example of a data protection appliance is a Data Domain Restorer (DDR). An example of a client-side deduplication library is DDBoost. These products are provided by Dell Technologies of Round Rock, Texas. Some embodiments are described in conjunction with the DDBoost protocol, Data Domain Restorer (DDR) storage system, and Data Domain filesystem as provided by Dell Technologies. It should be appreciated, however, that principles and aspects discussed can be applied to other filesystems, filesystem protocols, and backup storage systems.

In an embodiment, the clients access the data protection appliance using a protocol referred to as DDBoost. DDBoost is a system that distributes parts of a deduplication process to the application clients, enabling client-side deduplication for faster, more efficient backup and recovery. In an embodiment, the clients use the DDBoost backup protocol to conduct backups of client data to the protection storage appliance, restore the backups from the appliance to the clients, or perform other data protection operations. The DDBoost library exposes application programming interfaces (APIs) to integrate with a Data Domain system using an optimized transport mechanism. These API interfaces exported by the DDBoost library provide mechanisms to access or manipulate the functionality of a Data Domain filesystem. Embodiments may utilize the DDBoost File System Plug-In (BoostFS), which resides on the application system and presents a standard filesystem mount point to the application. With direct access to a BoostFS mount point, the application can leverage the storage and network efficiencies of the DDBoost protocol for backup and recovery. A client may run any number of different types of protocols as the filesystem supports multiple network protocols for accessing remote centrally stored data (e.g., Network File System (NFS), Common Internet File System (CIFS), Server Message Block (SMB), and others).

The deduplication server is responsible for handling communications and data between the client-side deduplication library and data protection appliance. For example, the deduplication server may perform deduplication in conjunction with the client-side deduplication library, compress and write data to the storage unit, read data from the storage unit, and the like.

The management server is responsible for managing, monitoring, and orchestrating data protection operations and workflows across the pool of data protection appliances. The management server may communicate with the appliances over the network via APIs to trigger backup and restoration operations, monitor the status of the operations, configure replication, add an appliance to the pool, view available storage capacity on an appliance, remove an appliance from the pool, or migrate a storage unit from one appliance in the pool to another appliance in the pool. A pool is a logical grouping of two or more data protection appliances. Appliances in a pool may be characterized as having similarly configured options. For example, the appliances in a pool may be configured with the same network settings, retention policies, security options, and the like. Having similar configurations facilitate a good user experience when migrating a storage unit from an appliance to another appliance, similarly configured, as there will be little or no configuration setup required with the other appliance in order to access the storage unit at the new location.

In an embodiment, the management server includes a migration module 166 that directs the migration of the storage unit. The management server may include a user interface such as a graphical user interface (GUI) or command line interface through which an administrator user 170 may issue instructions or commands. The management server may be deployed as an application on a physical server or virtual machine of the enterprise environment.

Occasionally, there may be a need to migrate or move a storage unit from a data protection appliance in the pool to a different data protection appliance in the pool. Such a need may arise due to system maintenance or storage on an appliance approaching capacity. Migrating a storage unit can be disruptive as it generally requires a system administrator to intervene and stop ongoing data protection operations (e.g., backups, replications, or the like). It is desirable to be able to migrate a storage unit to a different appliance in a manner that is transparent to the application and without intervention from the system administrator. In an embodiment, systems and techniques provide a server-initiated connection for a storage unit migration that is transparent to the application and thus does not require system administrator intervention. The migration technique can be used to help rebalance storage units across multiple appliances so that a particular appliance is not over-utilized. In an embodiment, migration is triggered manually, such as by the administrator issuing a request to migrate a storage unit from a first appliance to a second appliance. In other embodiment, the migration is triggered automatically.

The filesystem provides a way to organize data stored in an appliance and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. A namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes.

The clients may include servers, desktop computers, laptops, tablets, smartphones, internet of things (IOT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage includes, in addition to user data segments, other data structures storing metadata to facilitate access to the data via filesystem protocols, scaling of the filesystem, and deduplication. In particular, storage includes a namespace and fingerprints, among other data structures. In an embodiment, the namespace is held in a tree structure and, more specifically, a Btree. The fingerprints correspond to unique hash values calculated from the data segments and may be stored in a fingerprint index. Further discussion is provided below.

In an embodiment, the storage of an appliance includes disk-based storage such as hard disk drives (HDDs), solid-state drives (HDDs), or both. The storage may include multiple drives arranged into fault-tolerant configurations and different tiers of devices offering different levels of performance and storage capacity. For example, high-density HDDs may be used for primary storage of file data while SSDs may be used for metadata and caching. Storage may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks.

Thus, storage may represent logical storage that includes any number of physical storage devices connected to form a logical storage.

Figure 2:
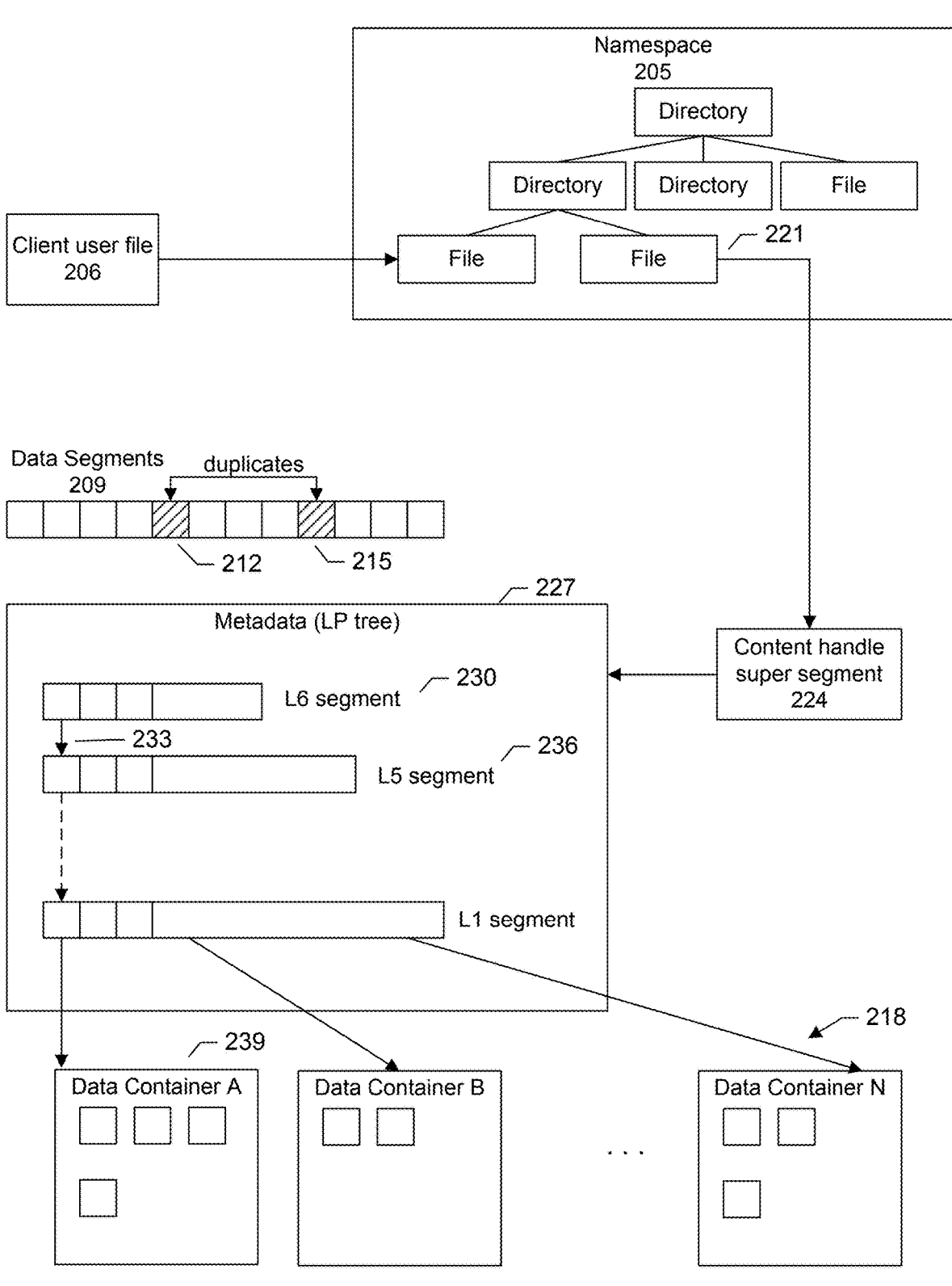
FIG. 2 shows an example of a deduplication process, according to one or more embodiments.

FIG. 2 shows a block diagram illustrating a deduplication process of the filesystem according to one or more embodiments. A deduplicated filesystem is a type of filesystem that can reduce the amount of redundant data that is stored. As shown in the example of FIG. 2, the filesystem maintains a namespace 205. Further details of a filesystem namespace are provided in FIG. 3 and the discussion accompanying FIG. 3.

The process of backing up a file to the filesystem may be referred to as ingest. More particularly, as data, such as incoming client user file 206, enters the filesystem, it is segmented into data segments 209 and filtered against existing segments to remove duplicates (e.g., duplicate segments 212, 215). A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content handle 221 of the file is kept in the filesystem's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the filesystem may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

Figure 3:
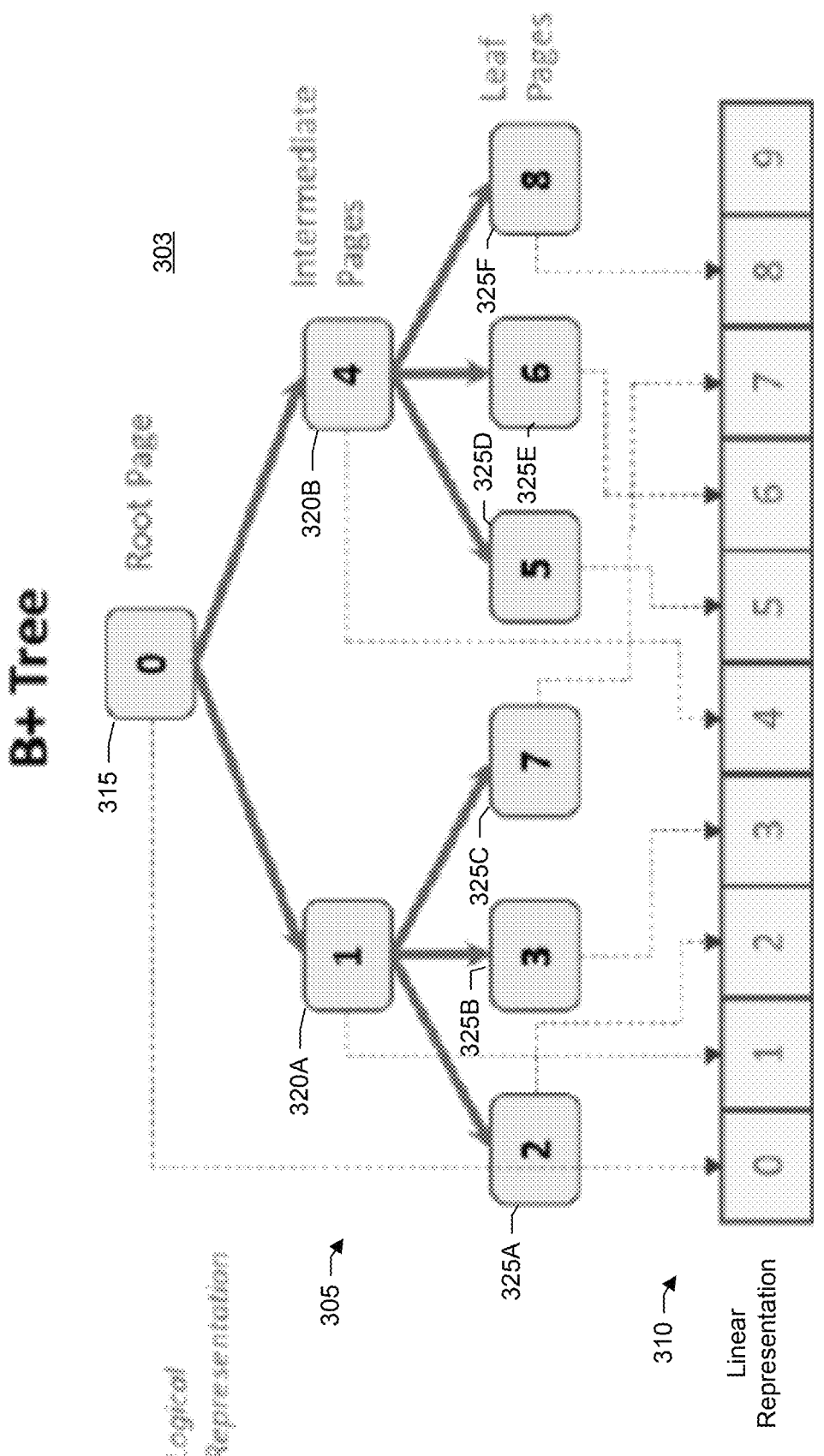
FIG. 3 shows an example of a namespace, according to one or more embodiments.

FIG. 3 shows further detail of a namespace of the filesystem. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 3 shows an example of a B+ Tree 303 in a logical representation 305 and a linear representation 310. In this example, there is a root page 315, intermediate pages 320A,B, and leaf pages 325A-F. The broken lines shown in FIG. 3 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the filesystem. The key references a payload identifying an inode number of the file and thus a pointer to content or data of the file. There can be another key for each file that identifies a name of the file.

FIG. 4 shows an overall flow of a first stage for a migration of a storage unit. FIG. 5 shows an overall flow of a second stage of the migration. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

Referring now to FIG. 4, in a step 410, a forechannel connection is established from a client-side deduplication library at a client to a deduplication server at a first data protection appliance to carry file input/output (IO) from the client to a first storage unit at the first data protection appliance. The file IO may be associated with ingesting one or more (e.g., multiple files). There can be multiple files being ingested concurrently or in parallel across multiple storage units and appliances. Thus, the client-side deduplication library may be managing multiple open connections and files between the client and one or more storage units. The storage units may reside within a single appliance or across multiple appliances. Consider, as an example, the ingestion of first and second files from the client. File IO associated with the first and second files may be transmitted to a single storage unit residing at a single data protection appliance. Alternatively, file IO associated with the first file may be transmitted to a storage unit while file IO associated with the second file may be transmitted to a different storage unit. Both storage units may reside on the same data protection appliance. Alternatively, the storage units may reside on different data protection appliances.

The open connections and files are associated with connection descriptors and file descriptors, respectively. These descriptors may be provided by the client-side deduplication library to the client application (e.g., backup application) for the application to use in its operations and workflows. A connection descriptor includes information to manage and maintain a communication session between the client and appliance. The information may include, for example, IP addresses or hostnames of the client and appliance, port numbers used for the connection, session information (e.g., session identifier or token to identify and authenticate the connection), protocol being used (e.g., NFSv3, SMB, or DD Boost), flags or attributes specifying connection settings (e.g., read-only, write, deduplication), performance parameters (e.g., buffer sizes and IO block size for data transfer), state information, diagnostic codes, and like, or combinations of these.

A file descriptor includes information to identify and manage an open file during the ingestion (e.g., backup, replication, or other data protection workflow) involving the client-sided deduplication library and data protection appliance. The information may include, for example, a logical file name or path, unique identifier for the file, pointers or references to deduplicated data segments, metadata indicating where the data segments are stored, access metadata (e.g., permissions or access controls for the file, ownership information), file metadata (e.g., file size, creation time, modification time, checksum for integrity verification), session-specific details associating the file to the ongoing operation (e.g., backup operation), flags indicating state of the operation, and the like, or combinations of these.

In a step 415, a server-initiated communication channel is established from the deduplication server at the appliance to the client-side deduplication library at the client to carry notifications or messages from the deduplication server to the client-side library.

In a step 420, a request is received at the deduplication server to migrate the first storage unit from the first data protection appliance to a second data protection appliance. In an embodiment, the request is received while or during a period of time that the first data protection appliance is receiving file IO associated with ingesting one or more files from the client-side deduplication library into the first storage unit. The request may be issued by an administrative user using the management server.

In a step 425, a synchronization operation is started to synchronize a second storage unit at the second data protection appliance to the first storage unit at the first data protection appliance. The client-side deduplication library, however, is not yet notified of the migration. Thus, the client-side deduplication library continues uninterrupted to send file IO to the first storage unit that resides at the first data protection appliance, while the second storage unit at the second data protection appliance is being synchronized with the first storage unit.

In other words, as the first storage unit continues to receive file IO from the client, existing data of the first storage unit is replicated or copied over to the second storage unit. The synchronization begins without notifying the client-side deduplication library of the migration. As will be discussed, upon completion of the synchronization, the client-side deduplication library is redirected to the second storage unit at the second data protection appliance. The first storage unit residing at the first data protection appliance is replaced by the second storage unit residing at the second data protection appliance to effectuate the "migration." Systems and techniques allow for migrating a portion of data residing at the first data protection appliance to a second data protection appliance without affecting other data that may be residing at the first data protection appliance and other operations involving the other data. Further discussion is provided below.

In a step 430, upon reaching a threshold level of synchronization of the second storage unit with the first storage unit, the deduplication server (or other service) sends a notification over the server-initiated communication channel to the client-side deduplication library that informs the client-side deduplication library about the migration. The client-side deduplication library is not notified of the migration until or after the threshold level of synchronization is reached. In an embodiment, the threshold level of synchronization is less than a complete synchronization of the second storage unit with the first storage unit. The threshold may correspond to a level at which synchronization is substantially complete. The threshold may correspond to a level at which the first and second storage units are substantially identical, but not 100 percent identical as the first storage unit continues to receive file IO from the client-side deduplication library.

For example, the threshold level of synchronization may be configured to be about 95 percent. The threshold level of synchronization may be less than 95 percent (e.g., 94, 93, 92, 91, or 90 percent). The threshold level of synchronization may be greater than or at least 95 percent (e.g., 96, 97, 98, or 99 percent). The amount of data being moved or copied from the first data protection appliance to the second data protection appliance may be many terabytes. Synchronizing the second storage unit at the second data protection appliance with the first storage unit at the first data protection appliance to the threshold level may require several hours or even days depending on factors such as the amount of data present at the first storage unit, available network bandwidth, processing capabilities of the first and second appliances, other ongoing operations and workflows being handled by the first and second appliances, and so forth. The first storage unit remains available to receive file IO from the client-side deduplication library throughout the synchronization process to the threshold level of synchronization. The client-side deduplication library is not informed of the migration until after the threshold level of synchronization has been reached.

FIG. 5 shows a flow for the second stage of the migration. In a step 510, the client-side deduplication library receives, over the server-initiated communication channel, a notification about the first storage unit being migrated to the second data protection appliance. The notification triggers a series of actions at the client-side deduplication library to help ensure that the migration appears seamless and transparent to the client application, e.g., backup application.

More specifically, in a step 515, the client-side deduplication library preserves or saves file and connection descriptors associated with the currently open connections and files of the one or more files being ingested to prevent their reuse with files other than the one or more files being ingested.

In a step 520, the client-side deduplication library closes the currently open connections and files to flush pending data to the first storage unit.

In a step 525, the client-side deduplication library sus-
pends the file IO to the first storage unit. The client-side
deduplication library, however, allows the client application
to continue sending requests concerning the files. These
requests may be stored in a temporary buffer managed by the
client-side deduplication library.

In a step 530, after the suspension of the file IO to the first
storage unit at the first data protection appliance, the dedu-
plication server completes the synchronization of the second
storage unit at the second data protection appliance. The
time to complete the synchronization is expected to be very
little (e.g., several seconds or minutes) since the majority of
data will have already been synchronized before notification
was sent to the client-side library and the suspension of file
IO. Thus, the temporary buffer used by the client-side
deduplication library is unlikely to overfill and cause tim-
eout or other problems.

In a step 535, upon completion of the synchronization of
the second storage unit to the first storage unit, the dedu-
plication server (or other service) sends a notification over
the server-initiated communication channel to the client-side
deduplication library that informs the client-side deduplica-
tion library about the completed migration and that directs
the client-side deduplication library to the second storage
unit at the second data protection appliance. The second
storage unit thereby takes the place of the first storage unit
to, in effect, complete the migration. The first storage unit
may be removed or deleted.

In a step 540, the client-side deduplication library upon
receiving the notification about the completed synchroniza-
tion, opens new connections to the second storage unit to
resume the file IO and reuses the connection descriptors that
were previously preserved or saved. Similarly, in a step 545,
the client-side deduplication library reopens the closed files
to resume the file IO and reuses the file descriptors that were previously preserved or saved. The reuse of the connection
and file descriptors allows the client application to remain
unaware of the migration. That is, the connection and file
descriptors exposed by the client-side library to the client
application before the migration are the same as the con-
nection and file descriptors exposed by the client-side library
to the client application after the migration.

Figure 6:
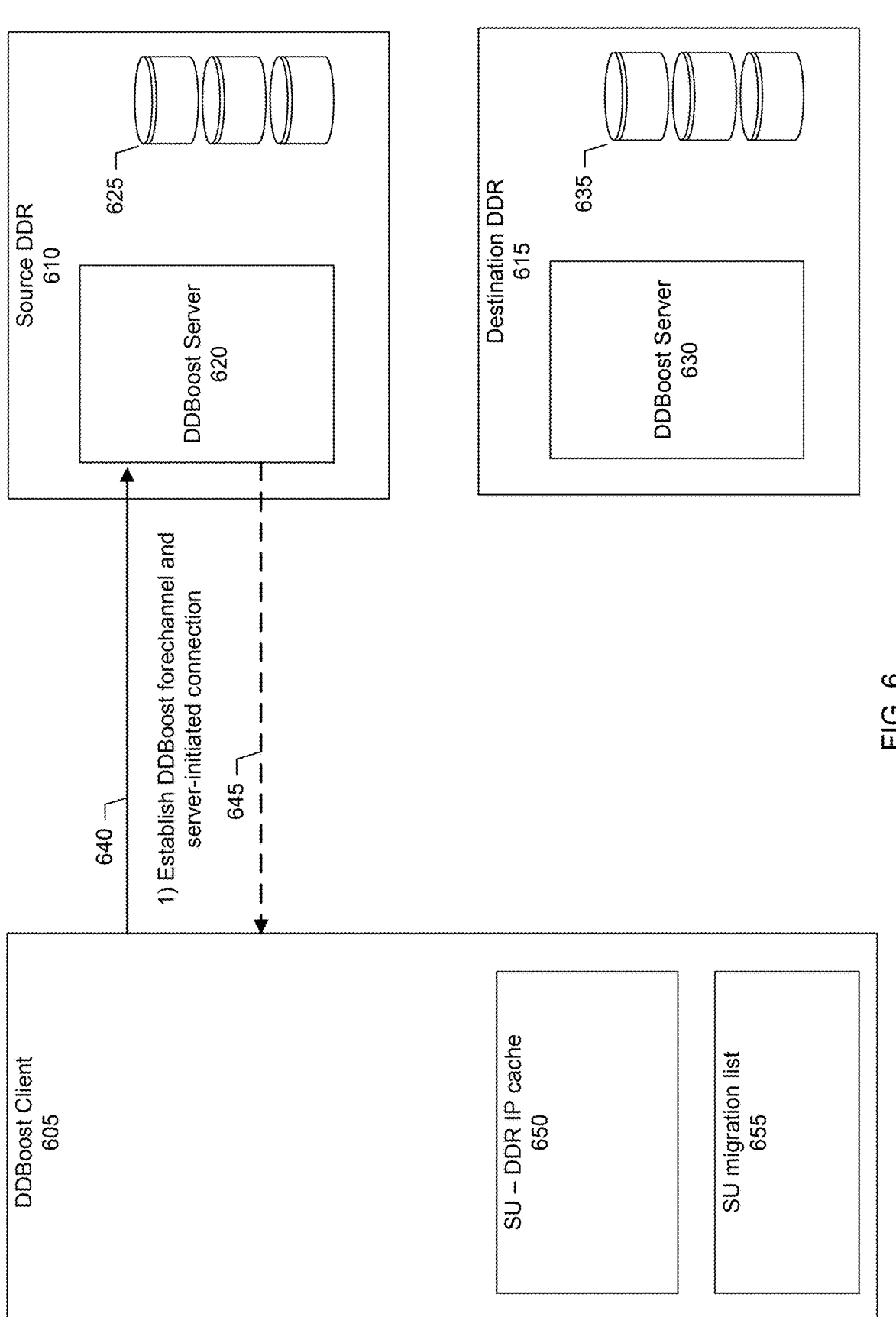
FIG. 6 shows an example of a state of the system at a time T1, according to one or more embodiments.

FIG. 6 shows an example of a state of the system at a time
T1. In this example, there is a client (e.g., DDBoost client)
605 and a pool of data protection appliances including a first
data protection appliance 610 and a second data protection
appliance 615. The first data protection appliance includes a
first deduplication server 620 and first storage 625. The
second data protection appliance includes a second dedu-
plication server 630 and second storage 635.

The first data protection appliance may be referred to as
a source appliance (e.g., source Data Domain Restorer
(DDR)). The second data protection appliance may be
referred to as a destination appliance (e.g., destination Data
Domain Restorer). A deduplication server may be referred to
as a DDBoost server.

A forechannel connection 640 is established from the
DDBoost client to the source DDR. A server-initiated con-
nection 645, shown in broken lines, is established from the
source DDR to the DDBoost client.

The DDBoost client maintains a cache 650 that includes
a mapping of a storage unit to an IP address of an appliance
(e.g., DDR) on which the storage unit resides. The mapping
allows the DDBoost client to locate a particular DDR on
which a particular storage unit resides. The DDBoost client
further maintains a list 655 of storage units under migration.

In an embodiment, migration_start and migration_com-
plete messages are sent over a server-initiated communica-
tion channel from a DataDomain system to a DDBoost
client. Table A below shows a flow for the migration start
stage.

TABLE A

| Step | Description |
|---|---|
| 1 | SU Migration Module initiating migration process notifies the DDBoost server about migration. In an embodiment, migration relies on a technique that may be referred to as m-tree replication (MRepl) to conduct the migration. In an embodiment, the replication includes repeatedly snapshotting the source, comparing previous and current snapshots to identify differences, and copying the differences to the destination. IOs are allowed to continue to the DDBoost server up until a certain threshold is reached. |
| 2 | Once the threshold is reached at which IOs are to be suspended, the migration module again sends an indication to the DDBoost Server about the final stage of migration. |
| 3 | DDBoost Server-initiated Infrastructure starts scheduling messages to all the DDBoost clients which are connected to this appliance to SUSPEND IOs for a particular Storage Unit. DDBoost server sends information about the Storage Unit Name in the server-initiated message. |
| 4 | DDBoost client, once it receives the message, discovers the Storage Unit name from a remote procedure call (RPC). |
| 5A | DDBoost client maintains a list of Storage Units which are under migration. |
| 5B | DDBoost client adds a barrier and stops doing any further IOs to that Storage Unit. |
| 5C | DDBoost client stops creating new connections and stops creating new files for the particular Storage Unit which is under migration. DDBoost client also maintains a Storage Unit to DataDomain IP address cache. Before looking up into the cache, a lookup is made of a list that maintains SU under migration. When the application opens a connection or opens a file, both the operation has Storage Unit name and that are checked by the DDBoost client. |
| 6 | For existing open files, the DDBoost client iterates over each File Descriptors for all Connection descriptors and finds the file path and validates if the file path is for a Storage Unit under migration. As discussed, the DDBoost client may be involved with operations involving other storage units. Checking whether the file path is for a storage unit under migration helps to avoid disrupting the operations involving the other storage units. |
| 7 | If yes (i.e., storage unit is under migration), the DDBoost client synchronizes the file but preserves its File Descriptor and does not allow it to be reused. The close and commit operation triggers a flush of dirty and stale data on the filesystem side. |

TABLE A-continued

| Step | Description |
|------|-------------|
| 8A | DDBoost client preserves all Connection Descriptors and does not allow that to be reused for the particular SU. |
| 8B | Both connection and file descriptors can be marked with a flag to indicate they are being under a migration scenario. |
| 8C | Clients may be connecting to multiple appliances and the flag marked on the descriptors helps to prevent reuse of any of those descriptors with the new connections. |
| 9 | The flag also helps in a case where the migration is taking more than the API timeout. For example, the DDBoost client can send a special error message back to the application to indicate a migration and ask for a retry. |

Table B below shows a flow for the migration end stage.

TABLE B

| Step | Description |
|------|-------------|
| 1 | Once the migration is over and DDBoost Storage Unit and User is created on destination system, the last step is performed. |
| 2 | As a part of the last step, the Source System notifies the DDBoost Clients again about Migration_Complete message along with the Storage Unit name and the New Destination DataDomain system. It should be appreciated, however, that the notification about the storage unit migration does not necessarily have to originate with the Source System. For example, in another embodiment, there is a redirector service that communicates with the DDBoost client. The redirector service is separate from the Source System. For example, the redirector service may be hosted by a host different from a host of the Source System. The migration service can trigger the migration and update a database with a location of the Storage Unit. The redirector service can read information from the database and notify the DDBoost client about the new location, notify the DDBoost client about a completion of the Storage Unit migration, or both. |
| 3 | On receiving this message: |
| 3A | DDBoost client updates its Migration List and removes the Storage Unit from that list |
| 3B | DDBoost client updates its SU to IP cache and removes the migration flag. |
| 3C | DDBoost client re-establishes all the Connections for that particular Storage Unit that were closed and uses the same Connection Descriptor that was used earlier after establishing connection to new Destination DD. |
| 3D | DDBoost client re-starts opening all the files that were previously opened and uses the same File Descriptor. |
| 4 | DDBoost client removes barrier and allows IO to continue and also allows new files to be opened. |

The systems and techniques described allows the DDBoost client to be aware of a Storage Unit Migration and allows them to pause IOs on the client-side itself without impacting backup applications in transparent manner.

Figure 7:
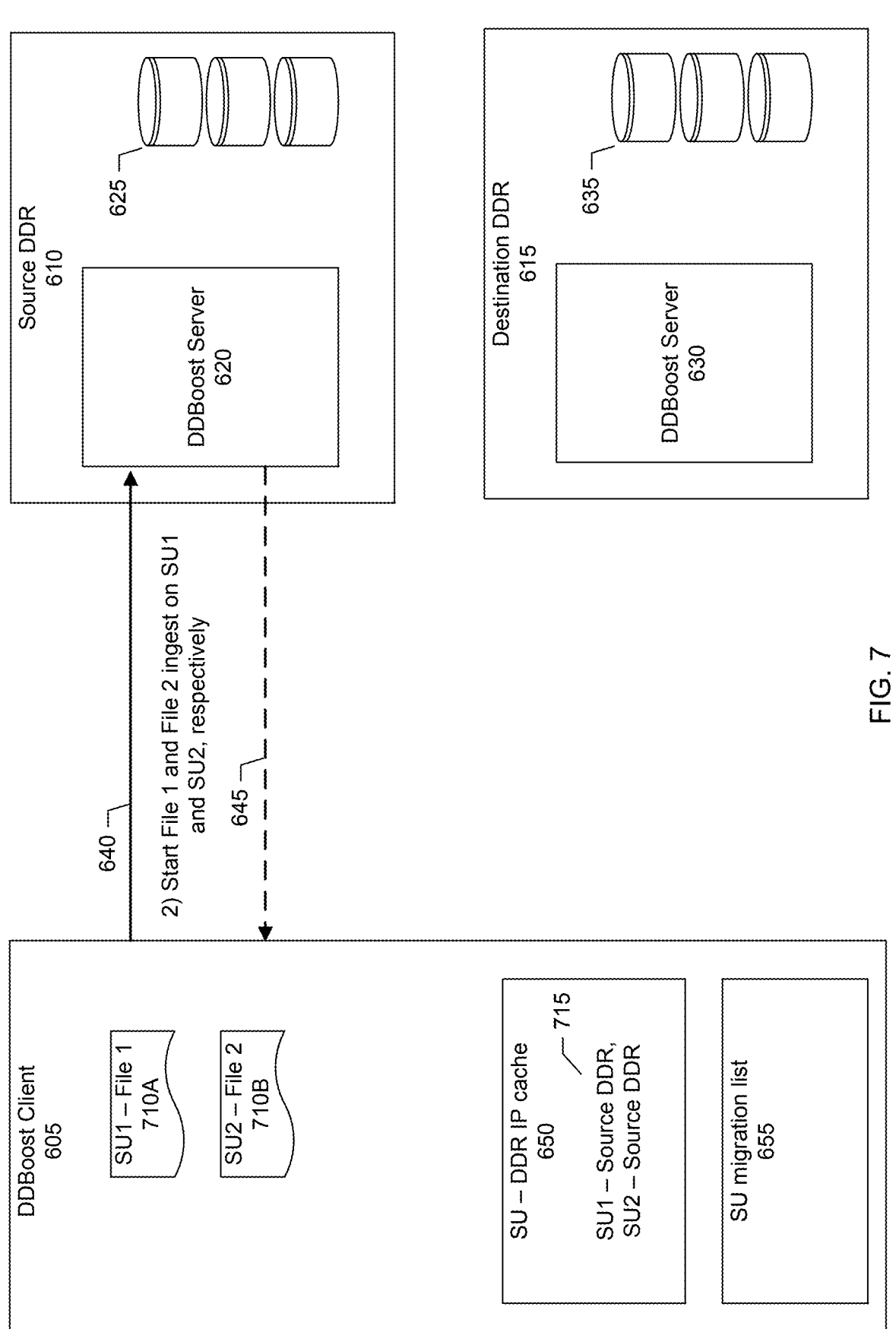
FIG. 7 shows an example of a state of the system at a time T2, according to one or more embodiments.

More particularly, FIG. 7 shows a state of the system at a time T2. As shown in the example of FIG. 7, the DDBoost client has opened first and second files 710A,B. The first and second files are in the process of being backed up, e.g., ingested, to the source DDR. Specifically, the first file is in the process of being ingested on a first storage unit residing on the source DDR. The second file is in the process of being ingested on a second storage unit residing on the source DDR. The DDBoost client maintains in the cache a mapping 715 of the storage units and the appliances on which the storage units reside. The mapping includes first and second entries. The first entry indicates that the first storage unit resides on the source DDR. The second entry indicates that the second storage unit resides on the source DDR. The state shown in FIG. 7 may be referred to as a steady state before migration.

Figure 8:
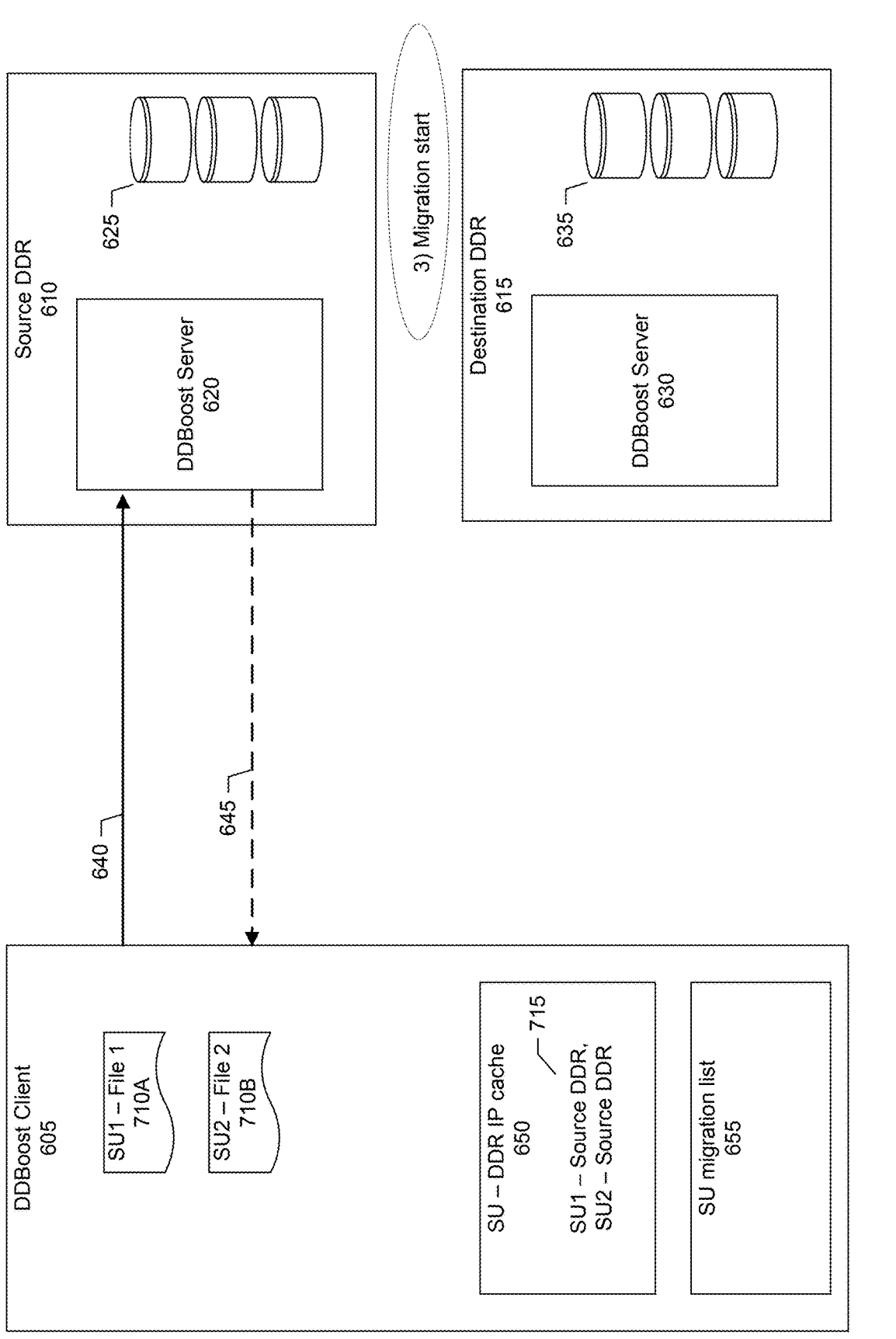
FIG. 8 shows an example of a state of the system at a time T3, according to one or more embodiments.

FIG. 8 shows a state of the system at a time T3 indicating a start of the migration.

Figure 9:
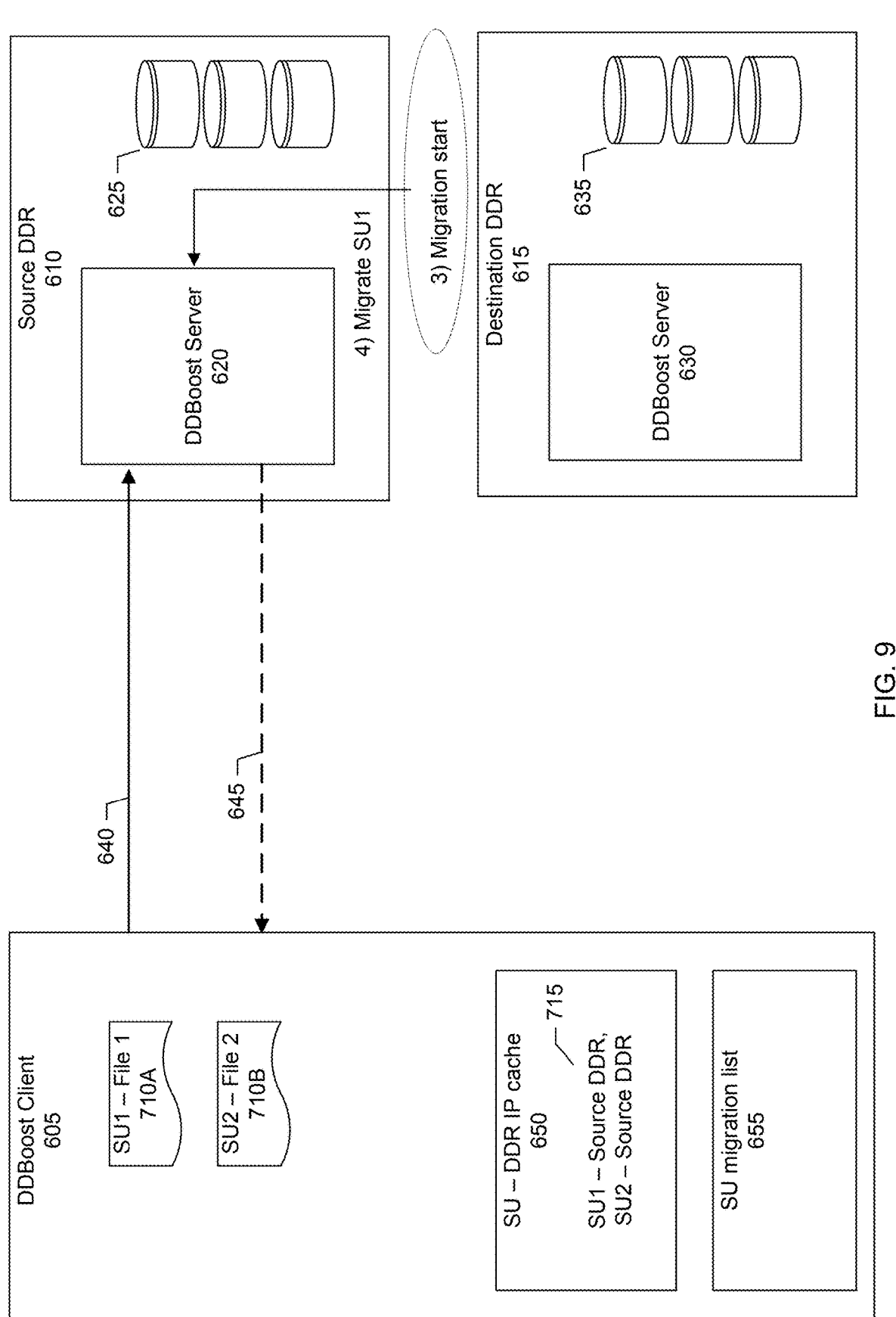
FIG. 9 shows an example of a state of the system at a time T4, according to one or more embodiments.

FIG. 9 shows a state of the system at a time T4 where the DDBoost server at the source DDR receives a request to migrate the first storage unit (SU1) from the source DDR to the destination DDR. As discussed, this begins a process of synchronizing a storage unit at the destination DDR to the first storage unit at the source DDR. Once a level of synchronization reaches a threshold level of synchronization, the DDBoost client is informed of the migration.

Figure 10:
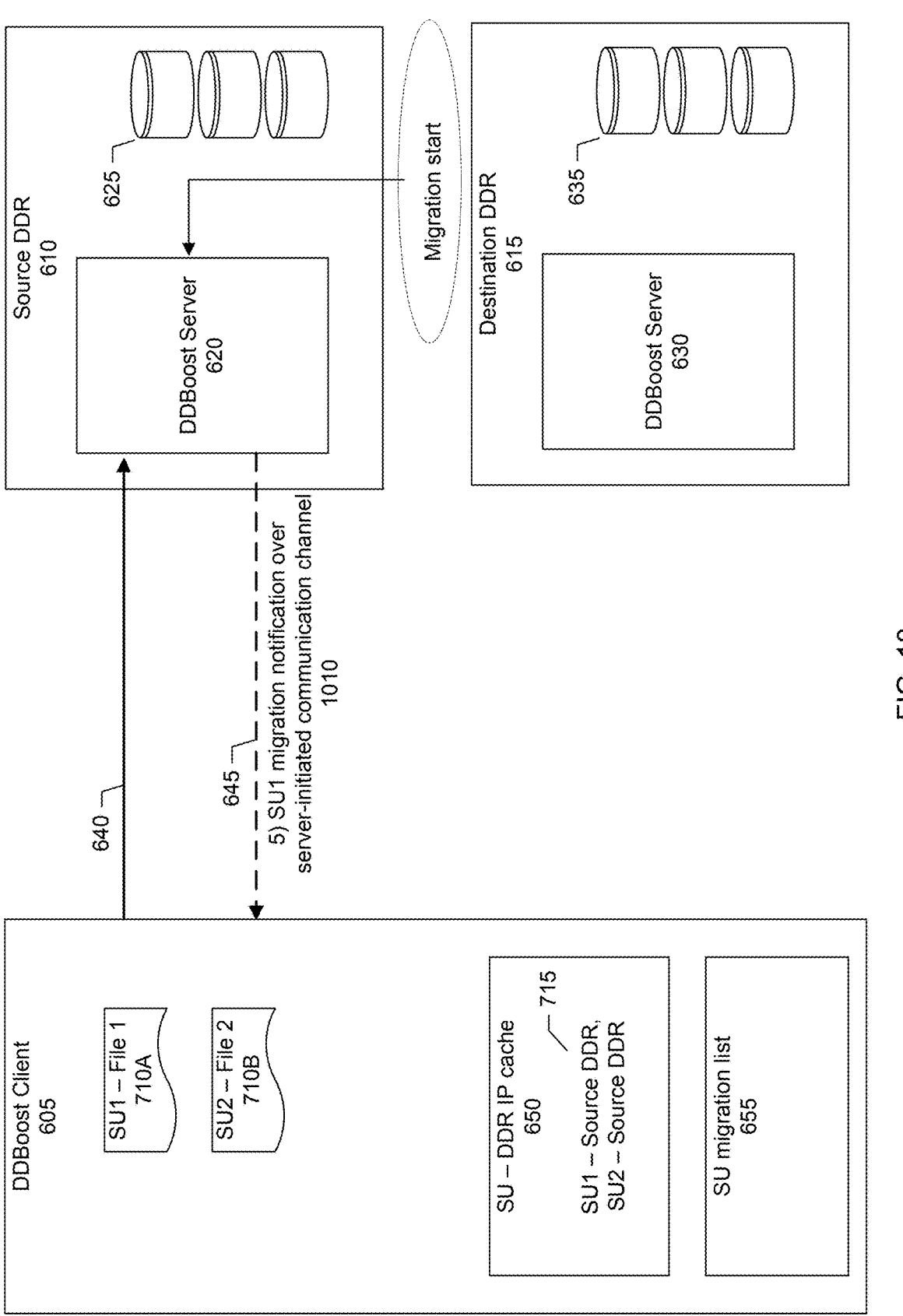
FIG. 10 shows an example of a state of the system at a time T5, according to one or more embodiments.

For example, FIG. 10 shows a state of the system at a time T5. In the example shown in FIG. 10, the storage unit at the destination DDR has reached the threshold level of synchronization with the first storage unit at the source DDR. The reaching of the threshold triggers the DDBoost server to send a migration notification 1010 to the DDBoost client over the server-initiated connection concerning the migration of the first storage unit.

Figure 11:
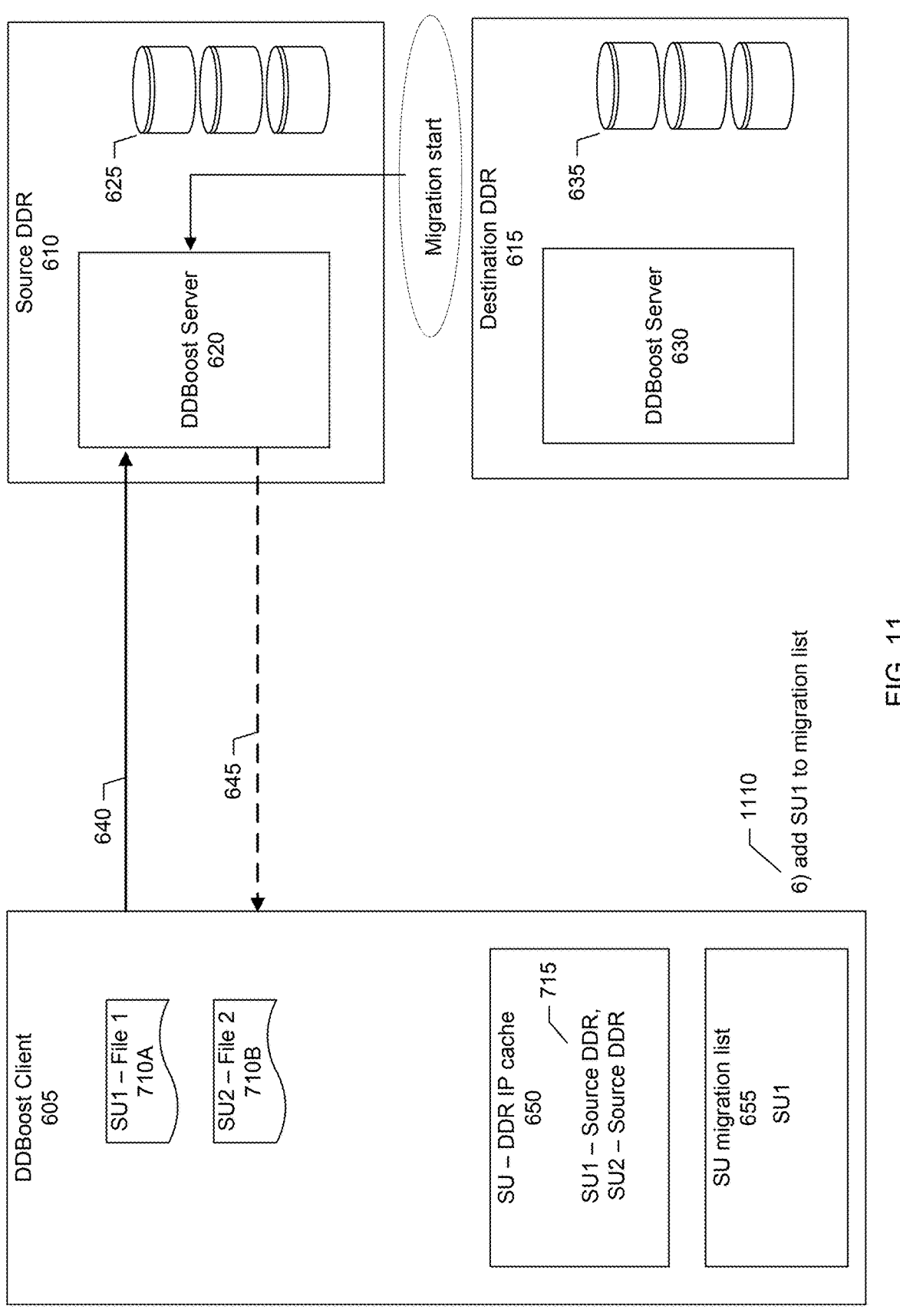
FIG. 11 shows an example of a state of the system at a time T6, according to one or more embodiments.

FIG. 11 shows a state of the system at a time T6. The DDBoost client, upon receiving the migration notification about the first storage unit, adds 1110 the first storage unit to the storage unit migration list. As discussed, the DDBoost client may have on-going operations with any number of storage units across any number of appliances. The storage unit migration list allows the DDBoost client to identify and track the storage units under migration. Specifically, file and connection descriptors associated with the storage unit under migration are blocked from being reused for other files.

In an embodiment, the file and connection descriptors are exposed to the client application, e.g., backup application. Blocking the reuse of the descriptors with other files helps to facilitate the transparency of the storage unit migration with respect to the client application. Specifically, the file and connection descriptors originally used for the files associated with the storage unit and presented to the client application before the migration are the same as the file and connection descriptors presented to the client application after the migration of the storage unit.

Figure 12:
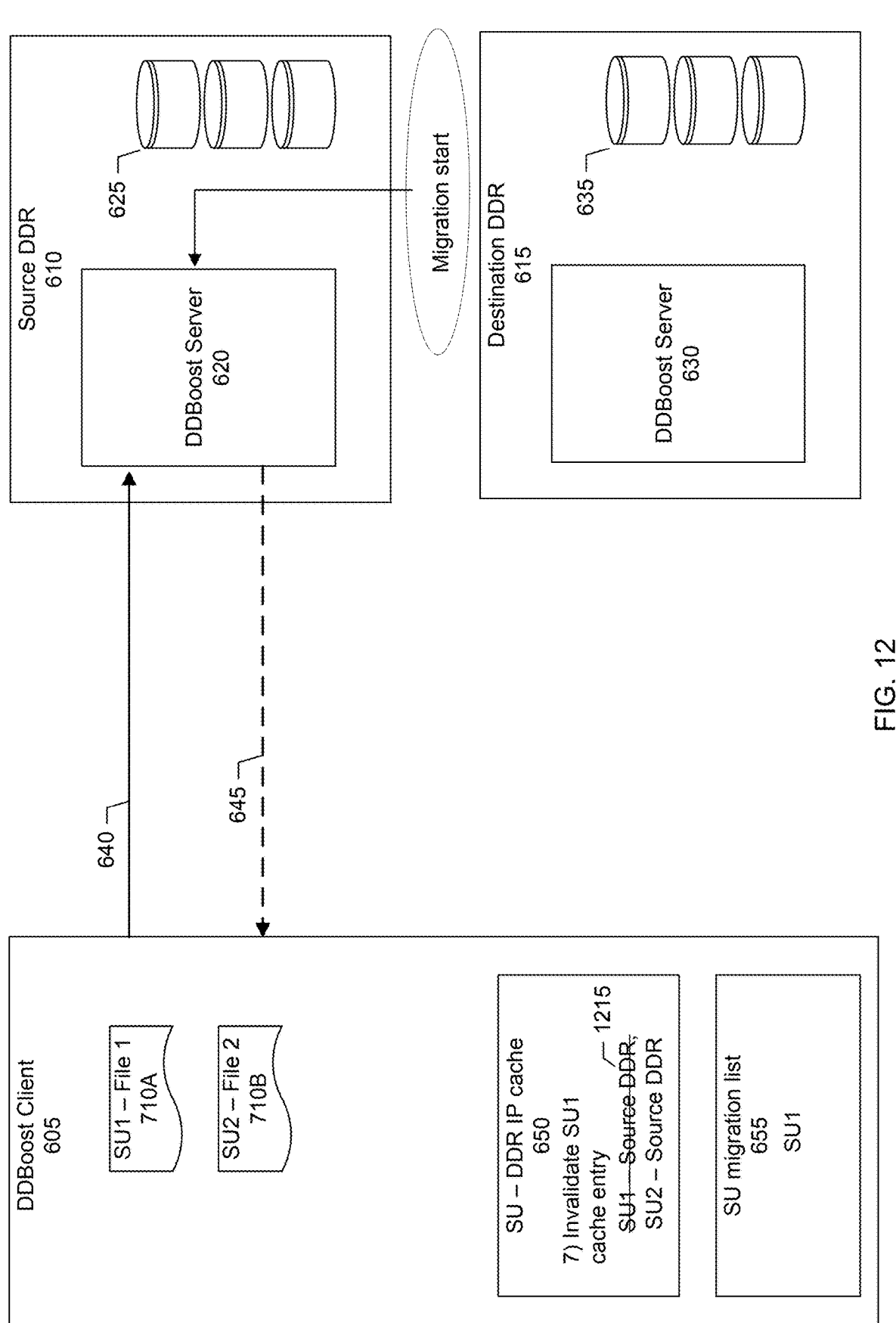
FIG. 12 shows an example of a state of the system at a time T7, according to one or more embodiments.

FIG. 12 shows a state of the system at a time T7. The DDBoost client, upon receiving the migration notification about the first storage unit, invalidates 1215 the cache entry indicating the first storage unit as residing at the source DDR.

Figure 13:
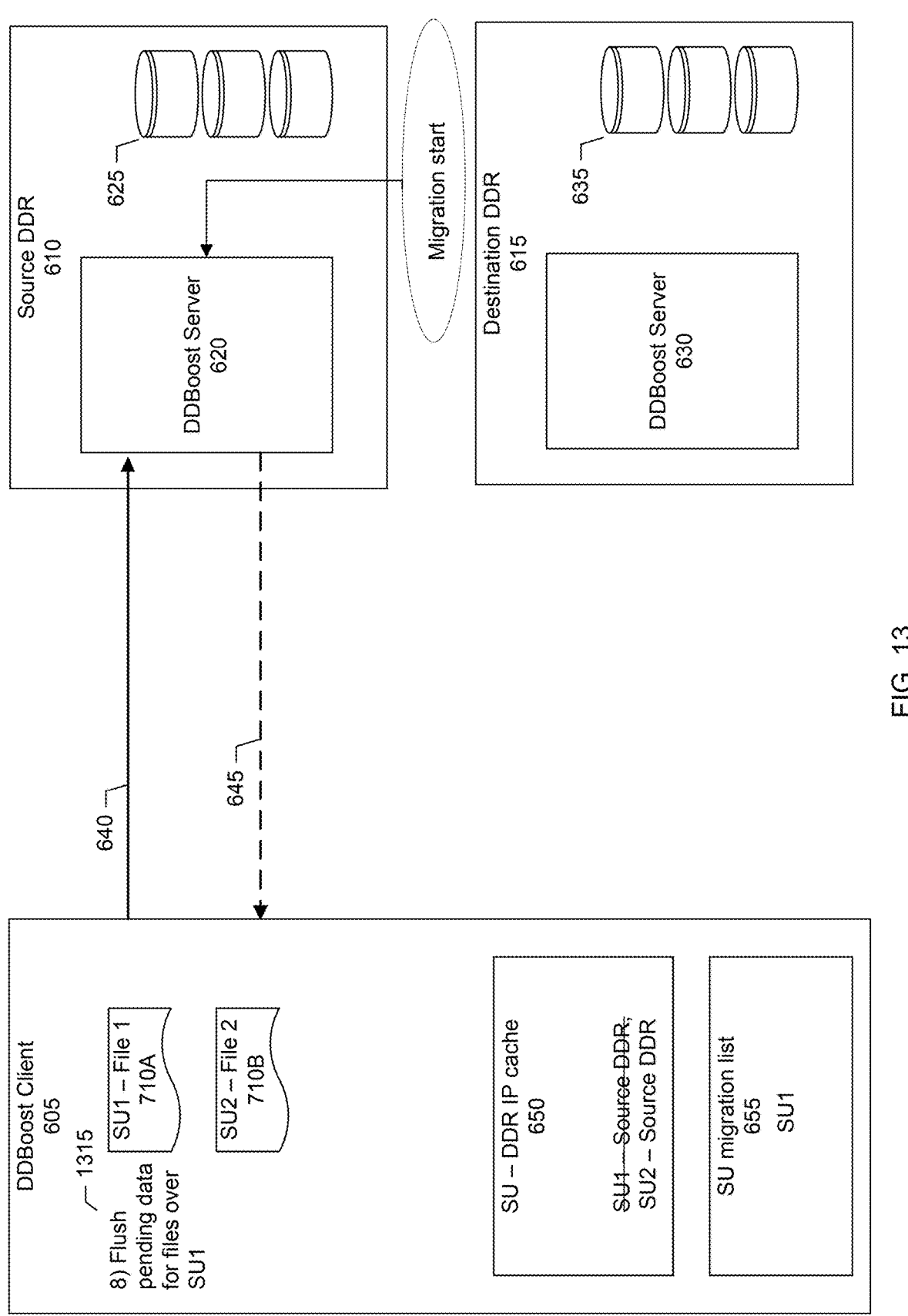
FIG. 13 shows an example of a state of the system at a time T8, according to one or more embodiments.

FIG. 13 shows a state of the system at a time T8. The DDBoost client, upon receiving the migration notification about the first storage unit, flushes 1315 pending data of open files on the first storage unit.

Figure 14:
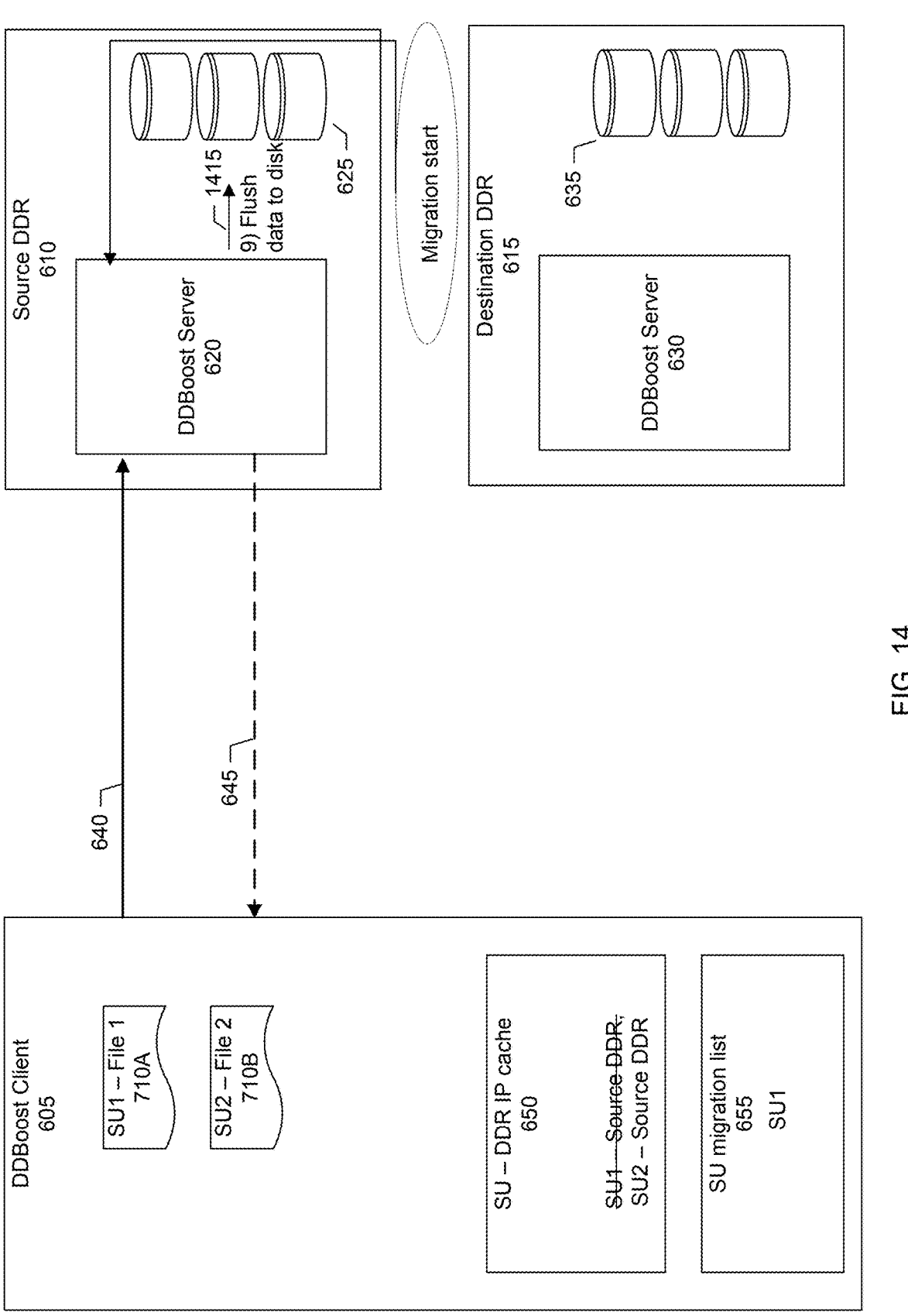
FIG. 14 shows an example of a state of the system at a time T9, according to one or more embodiments.

FIG. 14 shows a state of the system at a time T9. The DDBoost client request to flush pending data to disk is received by the DDBoost server and the DDBoost server, in turn, flushes 1415 data to disk. The pending data is committed to disk. Thus, any files currently involved with the ingestion process involving the first storage unit are brought to a consistent state. The flushing of in-flight data associated with the first storage unit to disk is performed regardless of any buffer reaching capacity. The flushing allows ingestion or other operations, including deduplication operations, to later resume cleanly with the destination DDR and without having to start from the beginning because of inconsistent file states.

Figure 15:
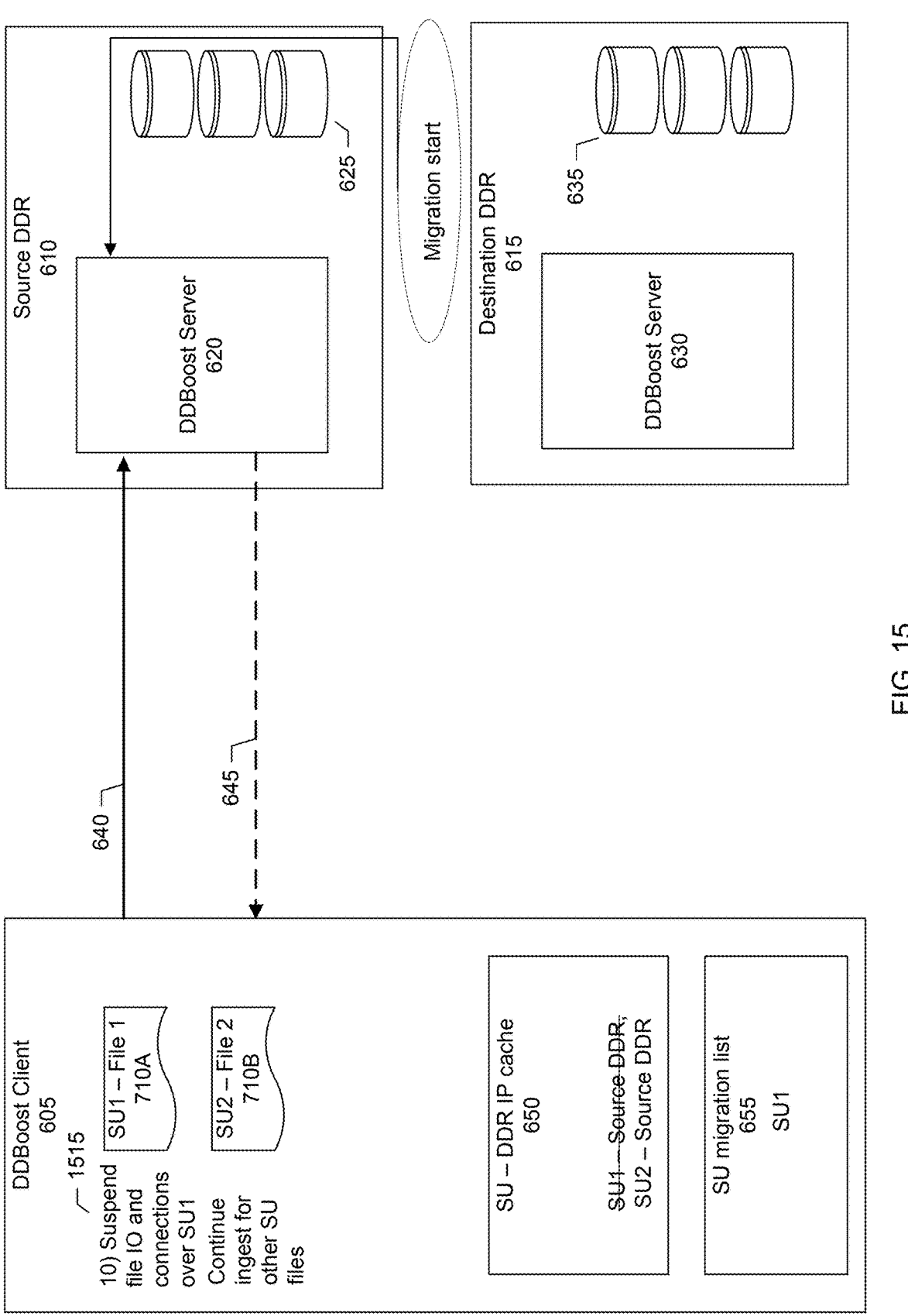
FIG. 15 shows an example of a state of the system at a time T10, according to one or more embodiments.

FIG. 15 shows a state of the system at a time T10. The flushing of pending data to disk for the first storage unit is accompanied by the DDBoost client suspending or pausing 1515 file IO and connections over the first storage unit. The DDBoost client stops all new connections and file descriptors for the first storage unit at the source DDR. Ingest, however, continues for other files involved with other storage units.

Figure 16:
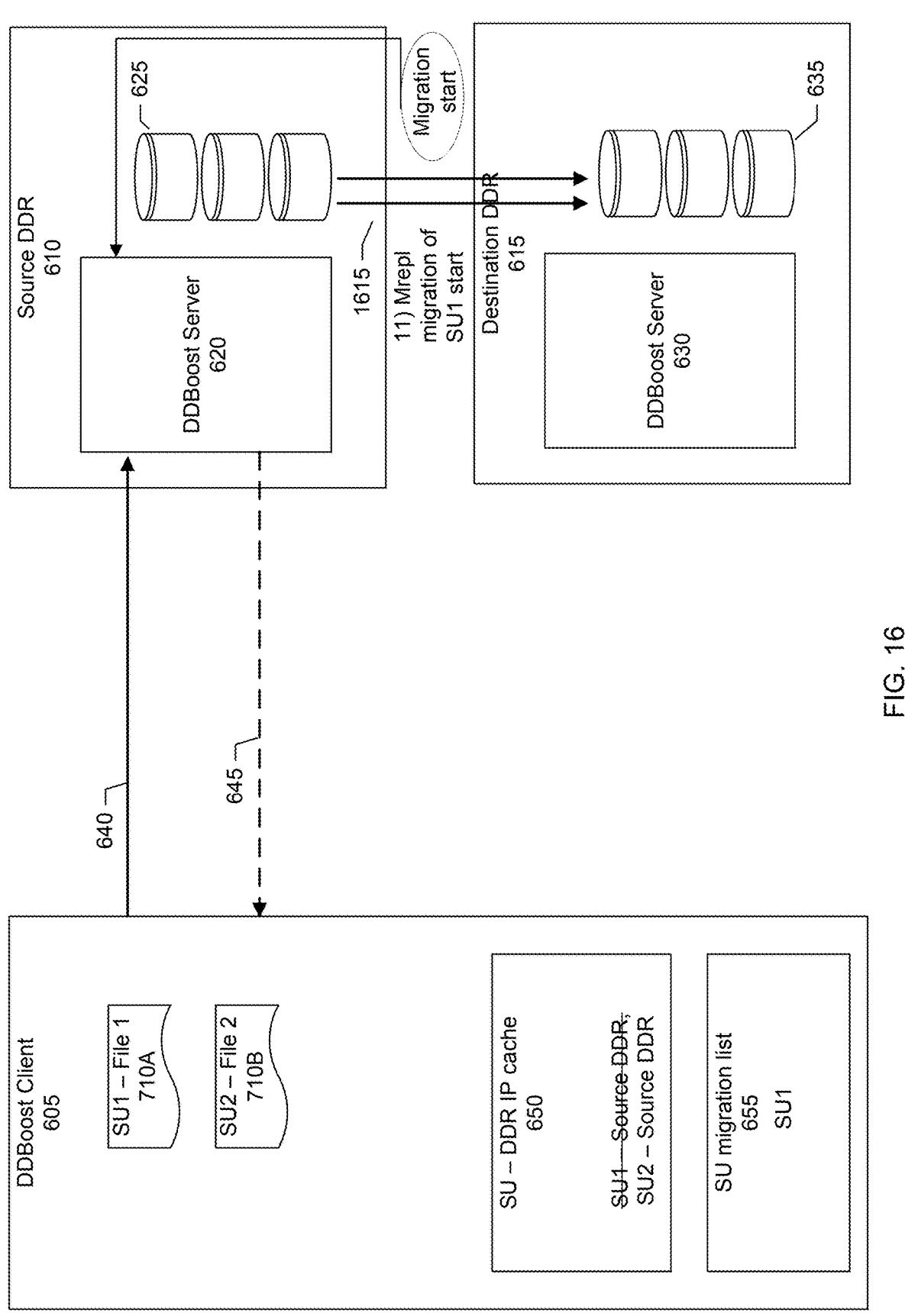
FIG. 16 shows an example of a state of the system at a time T11, according to one or more embodiments.

FIG. 16 shows a state of the system at a time T11. Once the DDBoost client suspends the file IO or traffic to the first storage unit at the source DDR, the migration 1615 of the first storage unit from the source DDR to the destination DDR can complete. Thus, any file data recently flushed to the first storage unit (see, e.g., FIG. 15, time T10) is captured and copied to the storage unit at the destination DDR.

Figure 17:
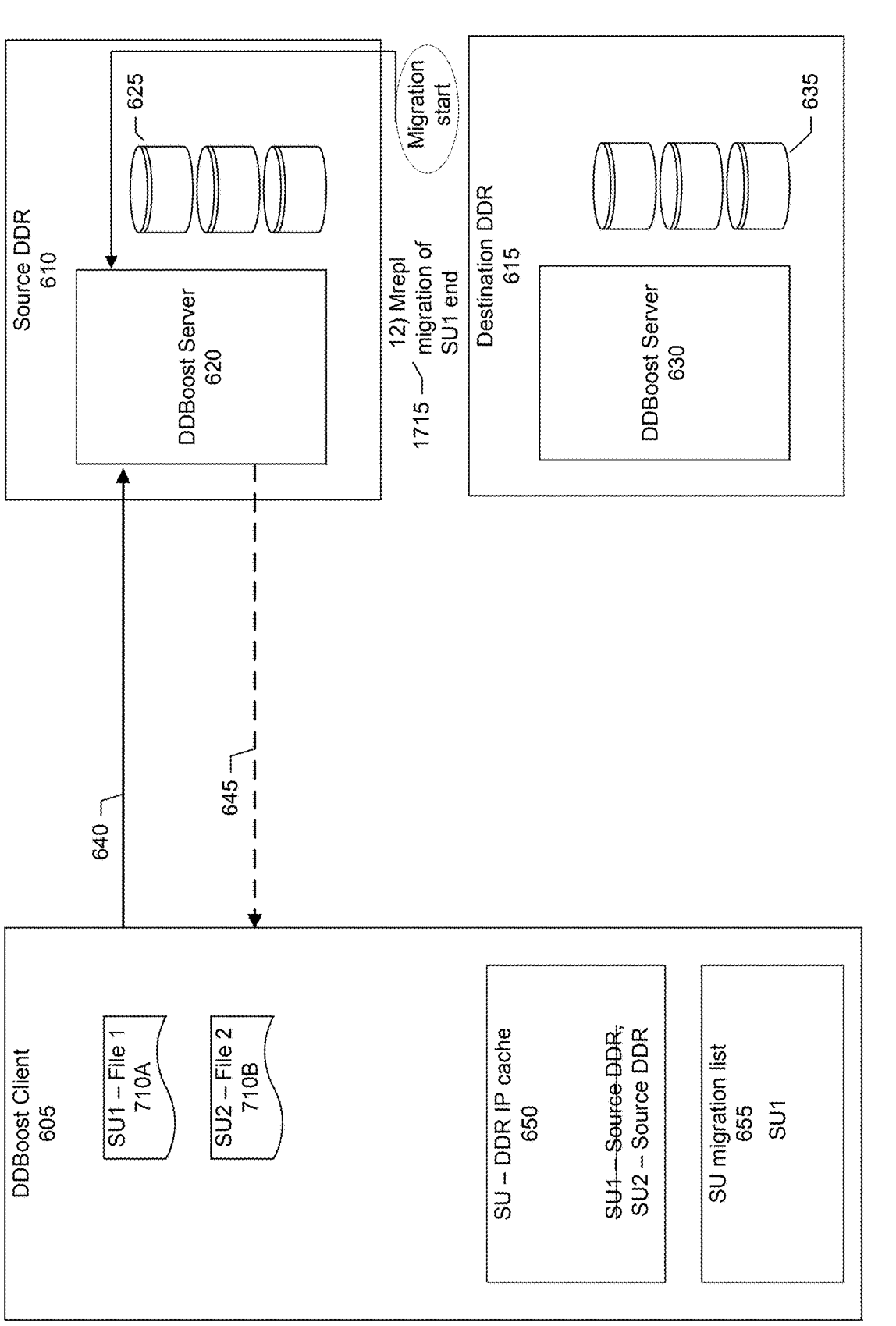
FIG. 17 shows an example of a state of the system at a time T12, according to one or more embodiments.

FIG. 17 shows a state of the system at a time T12 where the migration of the first storage unit from the source DDR to the destination DDR has ended 1715. As discussed, in an embodiment, the migration involves copying or replicating data of the first storage unit to another storage unit on the destination DDR. This allows the other storage unit on the destination DDR to function as a replacement for the first storage unit and thus effectuate the "migration."

Figure 18:
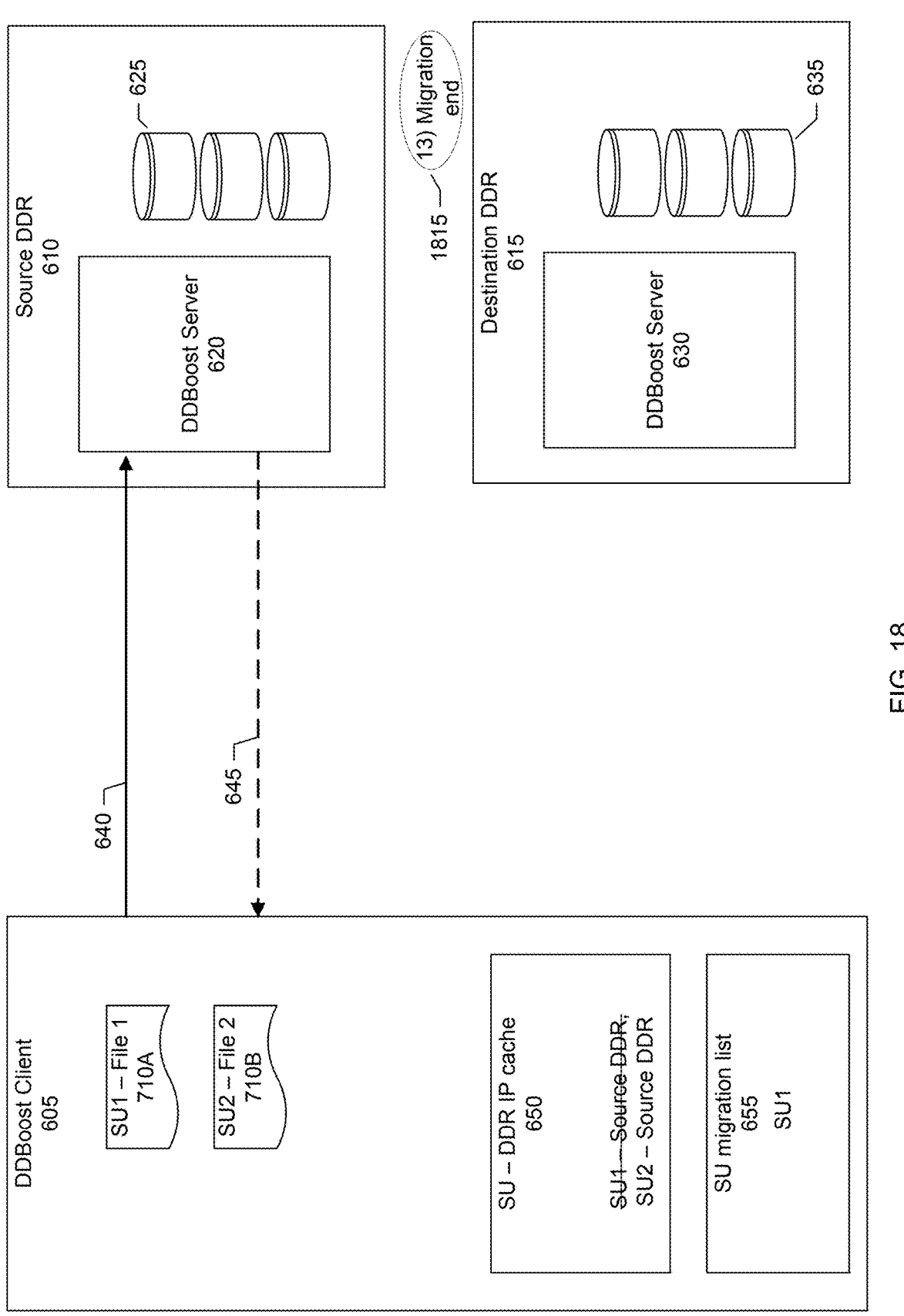
FIG. 18 shows an example of a state of the system at a time T13, according to one or more embodiments.

FIG. 18 shows a state of the system at a time T13 with the migration having ended 1815.

Figure 19:
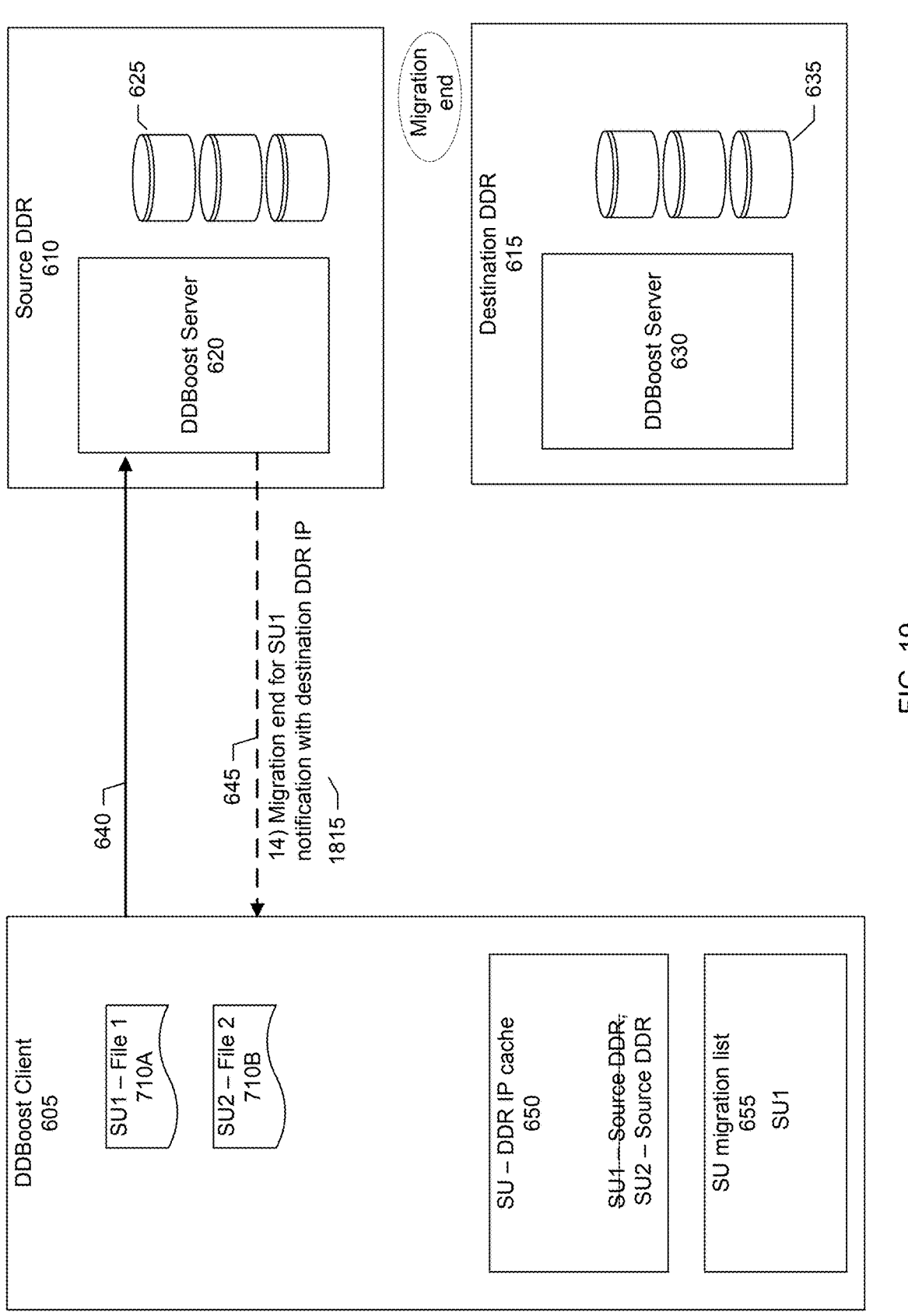
FIG. 19 shows an example of a state of the system at a time T14, according to one or more embodiments.

FIG. 19 shows a state of the system at a time T14. The completion of the migration of the first storage unit to the destination DDR triggers the DDBoost server at the source DDR to send 1815 a notification to the DDBoost client over the server-initiated communication channel that informs the DDBoost client that the migration has completed. The notification includes details about the migrated storage unit such as the IP address of the destination DDR where the first storage unit (or data of the first storage unit) now resides.

Figure 20:
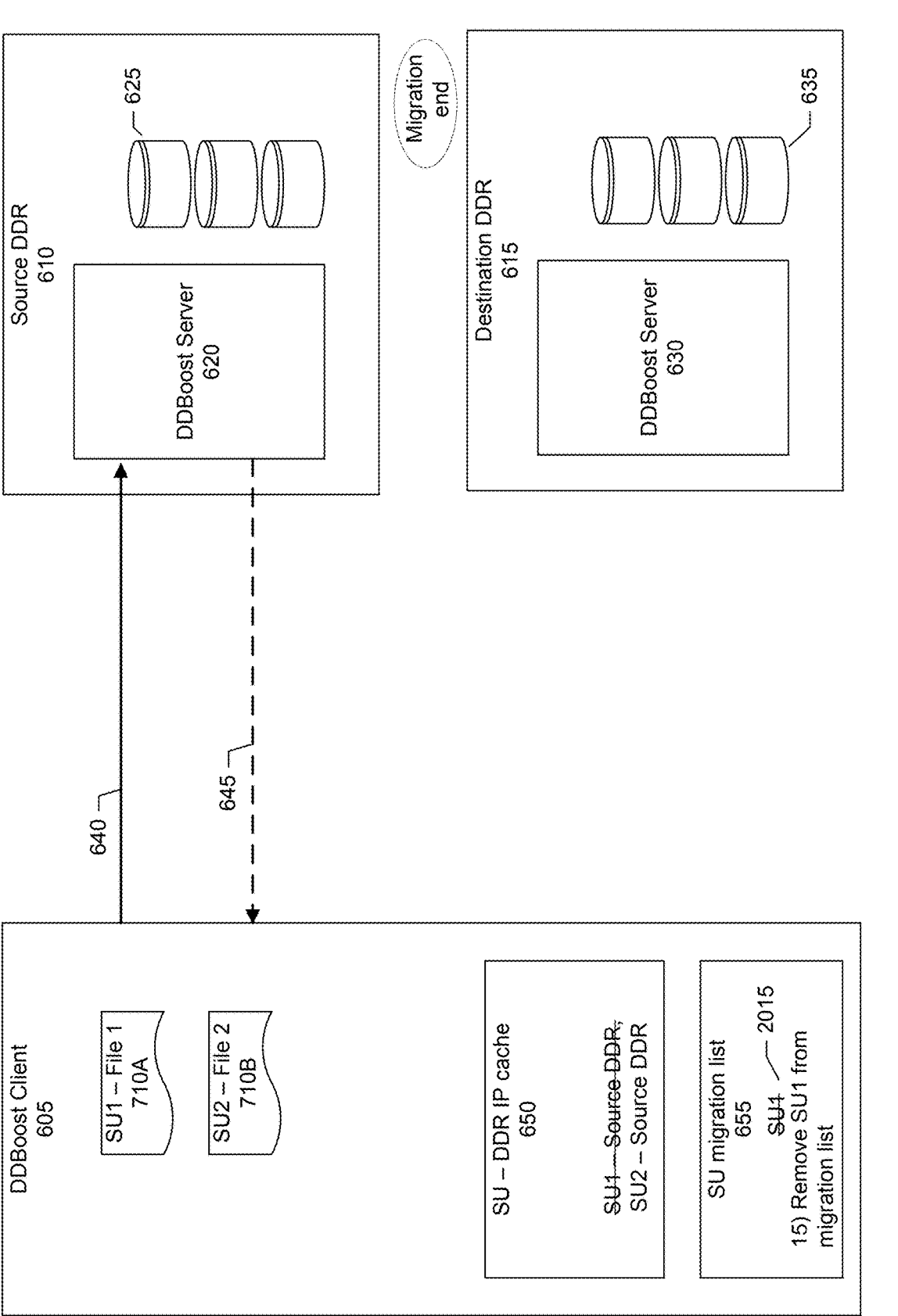
FIG. 20 shows an example of a state of the system at a time T15, according to one or more embodiments.

FIG. 20 shows a state of the system at a time T15. The DDBoost client, upon receiving the notification about the completion of the migration of the first storage unit, removes 2015 the first storage unit from the migration list.

Figure 21:
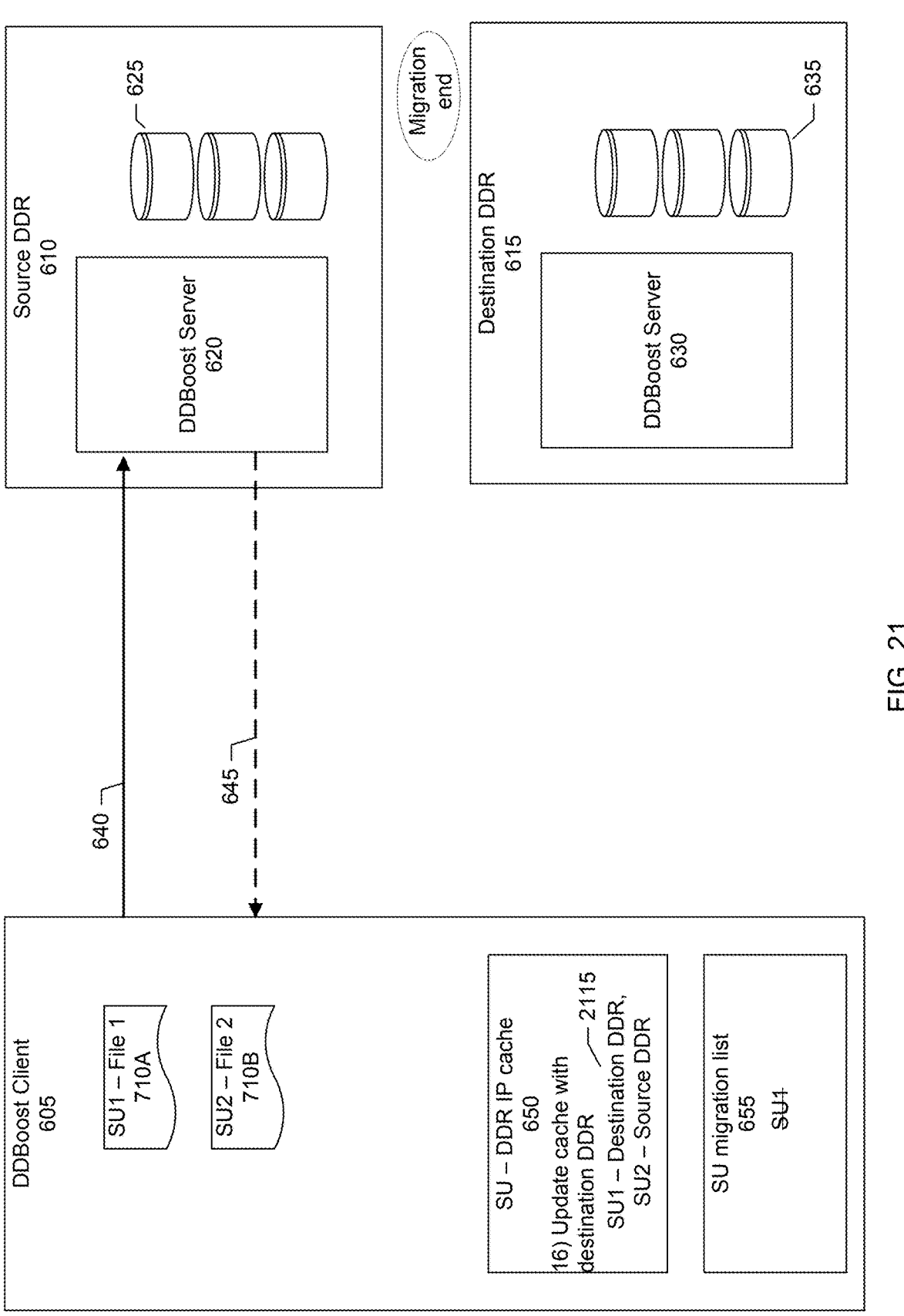
FIG. 21 shows an example of a state of the system at a time T16, according to one or more embodiments.

FIG. 21 shows a state of the system at a time T16. The DDBoost client, upon receiving the notification about the completion of the migration of the first storage unit, updates its cache with an entry pointing to the new location of the first storage unit as being on the destination DDR. Thus, a lookup in the cache can be performed to redirect new connections to the destination DDR. In an embodiment, the notification from the DDBoost server includes an IP address of the destination DDR and an indication that file IO for the first storage unit should now be redirected to the storage unit at the destination DDR.

Figure 22:
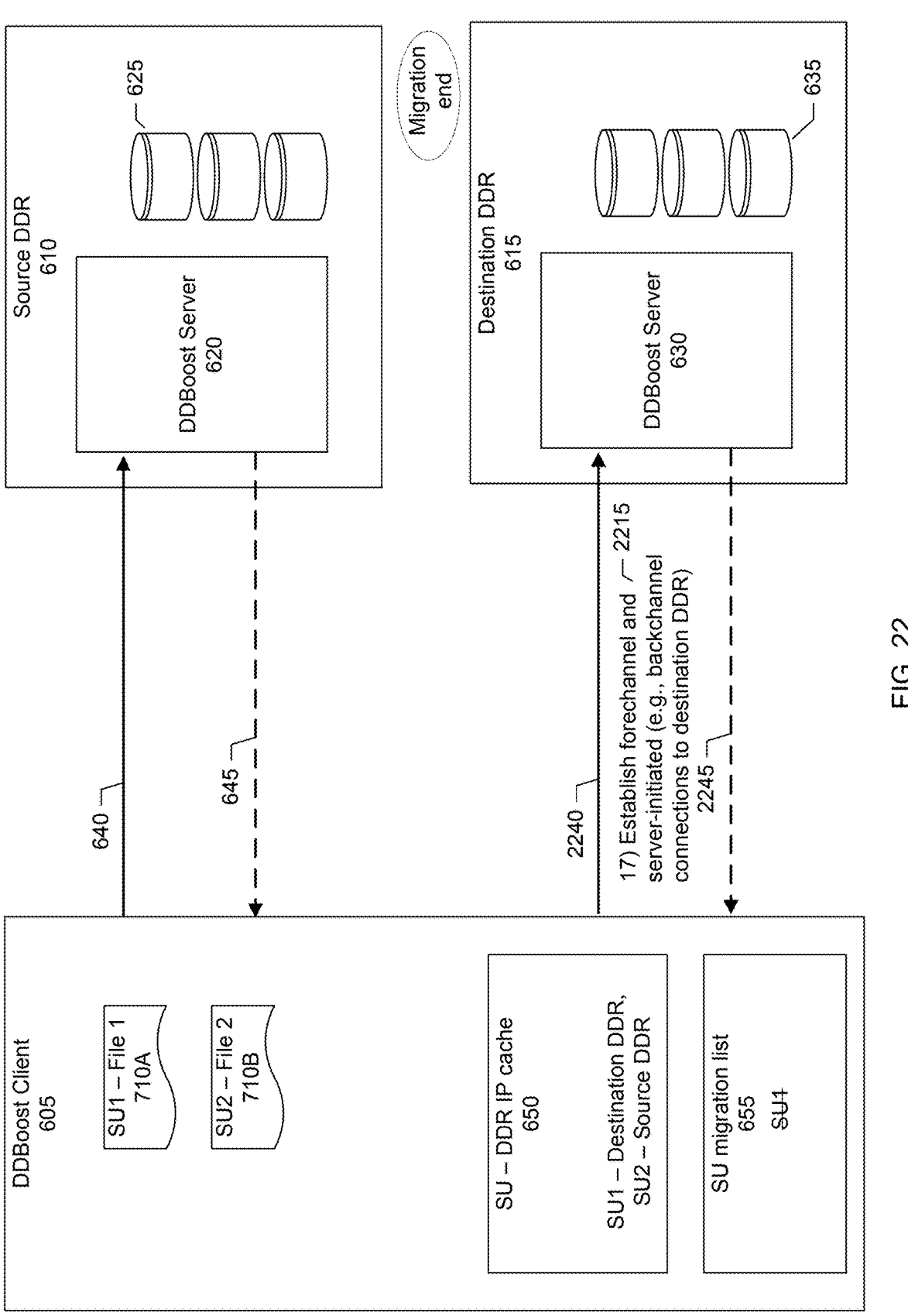
FIG. 22 shows an example of a state of the system at a time T17, according to one or more embodiments.

FIG. 22 shows a state of the system at a time T17. Once the first storage unit has been effectively "migrated" to the destination DDR, forechannel and server-initiated connections 2240, 2245, respectively, are established 2215 between the DDBoost client and destination DDR at which the first storage unit now resides.

Figure 23:
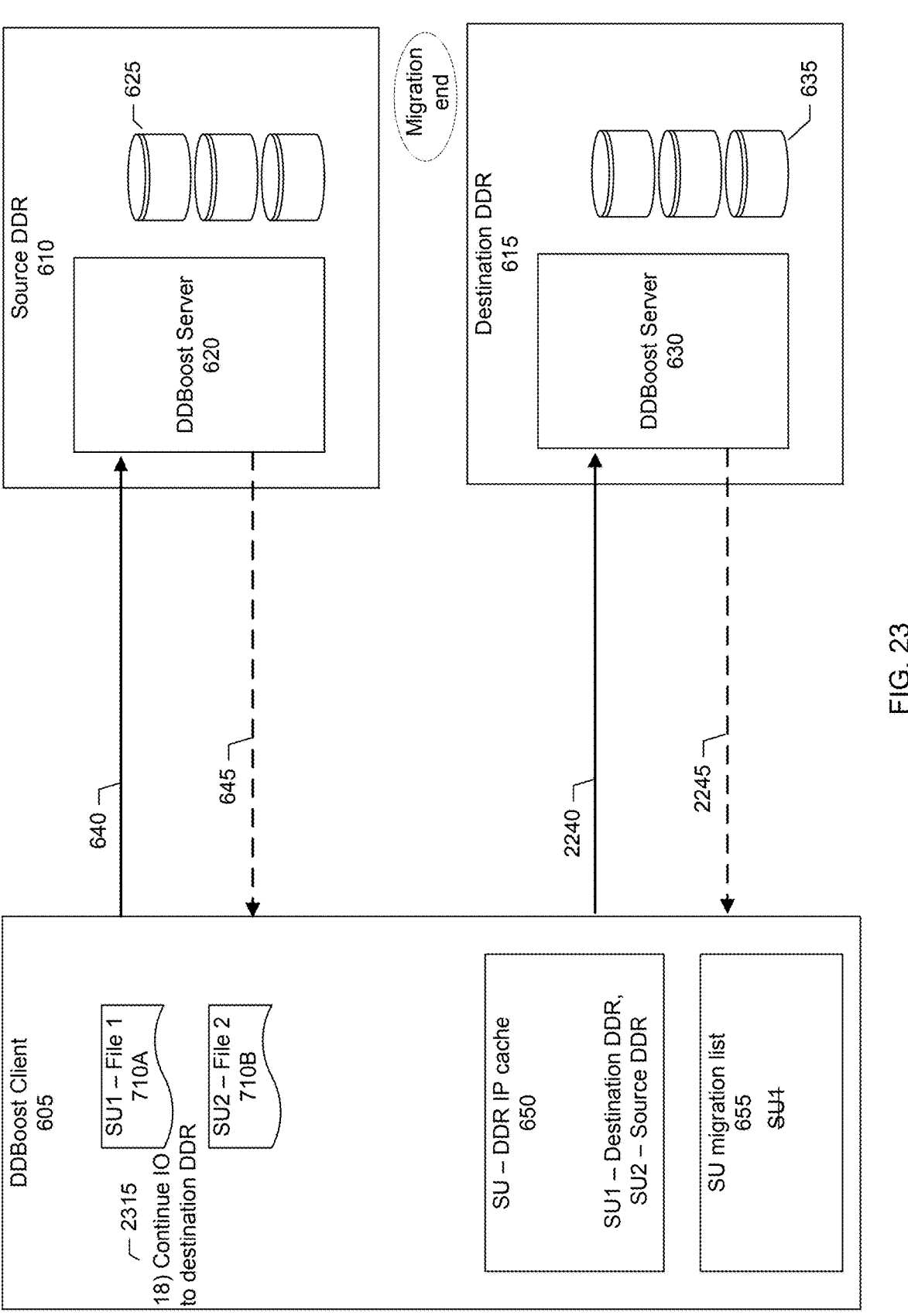
FIG. 23 shows an example of a state of the system at a time T18, according to one or more embodiments.

FIG. 23 shows a state of the system at a time T18. Once the forechannel and server-initiated connections have been established between the DDBoost client and the destination DDR, file IO for the first storage unit (now residing in effect at the destination DDR) can continue or resume 2315. The state shown in FIG. 23 may be referred to as a steady state after migration.

As discussed, the elapsed time period or duration beginning when file IO to the first storage unit is suspended (see, e.g., FIG. 15, time T10) to the time when file IO to the first storage unit resumes (see, e.g., FIG. 23, time T18) is expected to be very short (e.g., several seconds or minutes) compared to the time required to copy the majority of the storage unit data from the source DDR to the destination DDR (e.g., several hours or days). Copying the majority of the storage unit data from the source DDR to the destination DDR before the suspension of IO helps to reduce the risk of encountering timeouts or other problems as the client application is allowed to continue issuing requests to the DDBoost client throughout the period of suspension uninterrupted. The migration is transparent to the client application as the client application does not have to pause its operations.

Figure 24:
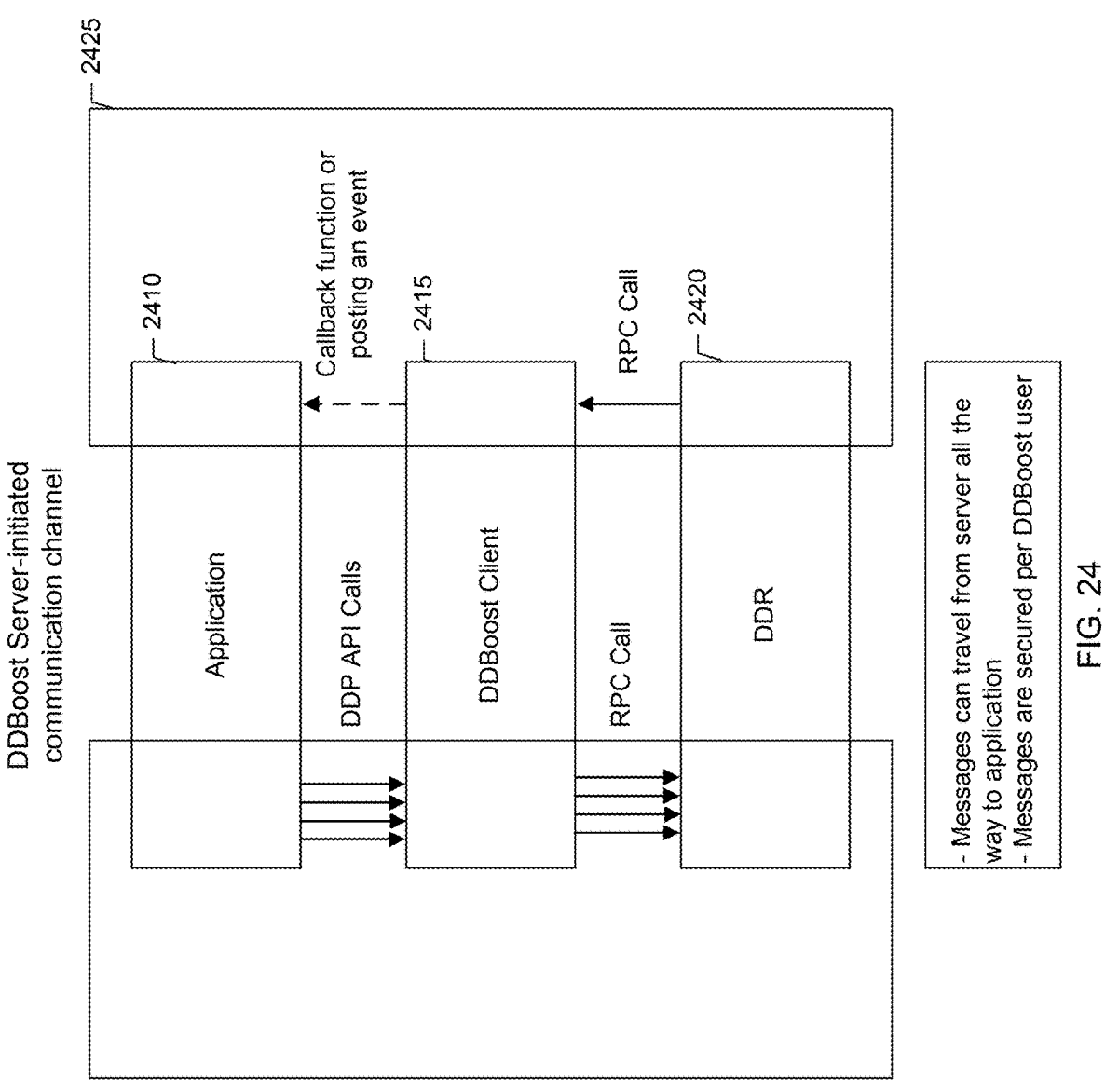
FIG. 24 shows a layer diagram of a server-initiated communication workflow, according to one or more embodiments.

FIG. 24 shows a block diagram of a DD Boost or server-initiated communication channel workflow. The example shown in FIG. 24 includes an application 2410 (e.g., client backup application), DD Boost client 2415 (e.g., client-side library), and DDR server 2420. In an embodiment, systems and techniques are provided for secure end-to-end notification of DD Boost server-side events. A typical workflow from a backup application to DDR via a DD Boost client is as follows. An application calls an API referred to as DD API into the DD Boost client and the DD Boost client sends one or more RPCs to DDRs.

In an embodiment, systems and techniques are provided for a protocol that allows server-side events to be sent back to the client and application. In an embodiment, the connection protocol is referred to as a server-initiated communication channel 2425. The server-initiated channel is used for cases where callback requests from DDR to DD Boost clients are required. Messages can travel from the server (e.g., DDR) to the DD Boost client to the application. The messages are secured for each DD Boost user.

In various embodiments, systems and techniques are provided for end-to-end and secured events messaging for client, authenticated user or storage unit specific events; mechanisms allowing file system level subsystems to use the server-initiated channel to deliver events; delivering messages back to either one client or multiple clients or all the clients; processing dead (or hung up) messages; and for switching between an existing connection to receive a server-initiated communication message on the client (without needing to have sessions).

Figure 25:
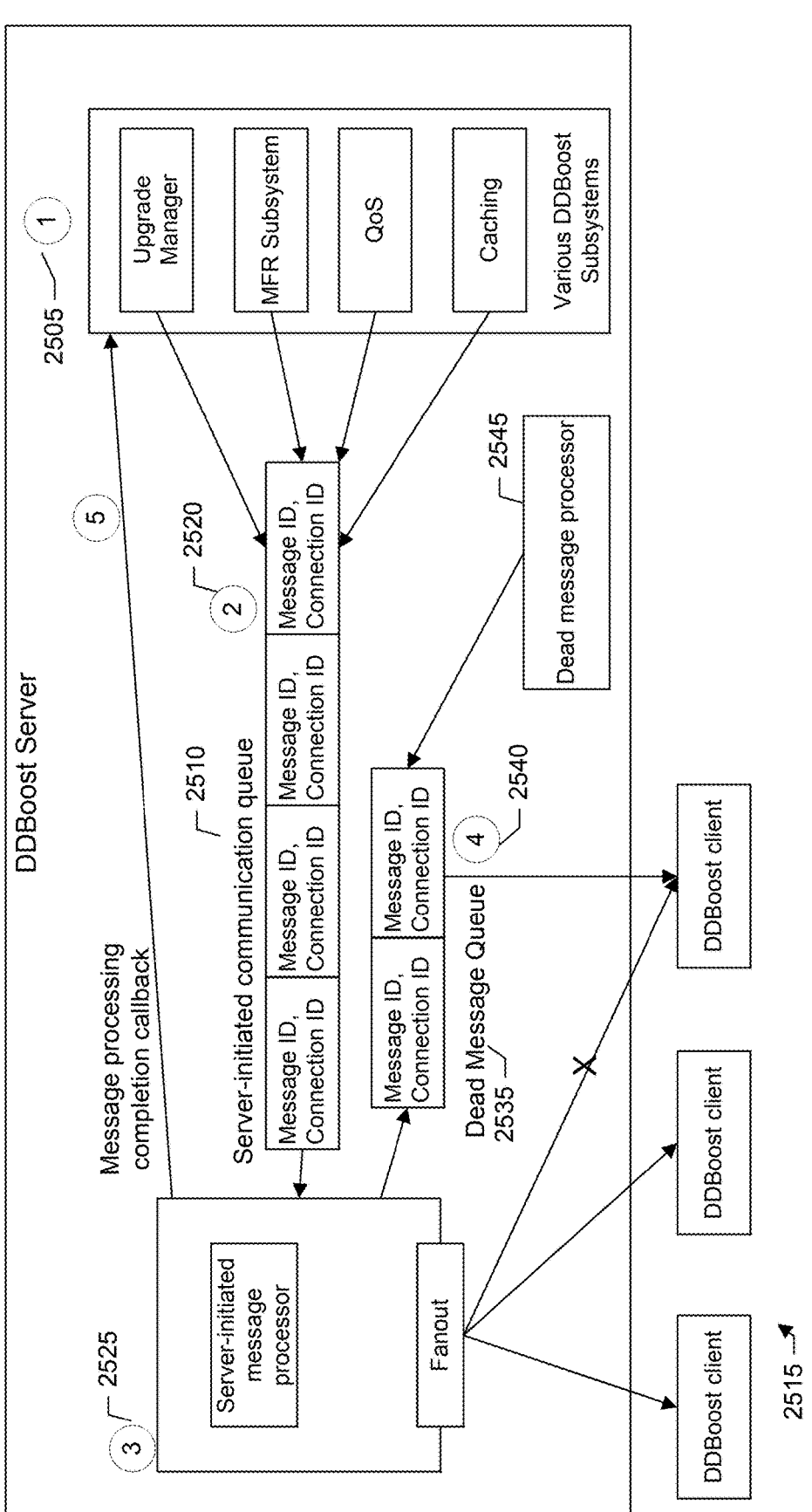
FIG. 25 shows a block diagram of a server-initiated communication connection at a server-side, according to one or more embodiments.

FIG. 25 shows a block diagram illustrating an overview of a DD Boost server-side implementation. In a first step 2505, various DD Boost/file system subsystems enqueue messages to a server-initiated message queue 2510 whenever they want to send out a message to a DD Boost client 2515 (e.g., client-side library or backup application). Some examples of events include MFR job completion, DD is undergoing upgrades, feature toggle change, QoS, and the like. A further listing of use cases are provided in a later discussion. The subsystem is able to register a callback that can be called back when the delivery of the message is successful. The subsystems are able to cancel the message at any point of time until the callback is not called. Cancelling of the message will only cancel the outstanding messages and not the ones which are being processed. Such subsystems can call an API to enqueue the message with the information such as message ID, message data, client identifier and callback function if required. Client identifier is specified in such a way to distinguish whether the message needs to be delivered to single client or multiple clients or all the clients.

In a second step 2520, the server-initiated message queue holds all the outstanding messages that need to be sent to the one client or multiple clients. In an embodiment, the queue is an ordered queue.

In a third step 2525, a server-initiated message processor 2530 retrieves messages from the server-initiated message queue and sends out messages to the DD Boost client. DD Boost server on DD maintains a pool of connections which are marked for server-initiated messages. In order to identify clients uniquely, the DD Boost client sends a unique ID per client instance to the DD Boost server. The server-initiated message processor iterates over the RPC connections and stores private data about the server-initiated message, UserID, StorageUnit, and the like at the RPC layer.

While sending RPC messages back to the client, the server-initiated message processor as shown in FIG. 25 calls the RPC layer helper function to find out all the current connections and filter out connections where an RPC message needs to be sent back based on the message and extra information stored per connection. It then invokes the RPC layer calls to send the message on the wire. If the message is undelivered, it is added to a dead message queue 2535.

In a fourth step 2540, the dead message queue is used for the retry mechanism. This ensures that primary messages are not logged because of unresponsive clients. A dead message processor 2545 works on the dead message queue to continue retry based on a configurable retry count and retry timeouts before abandoning sending out the message.

Table C below shows an example of an RPC server-initiated message.

TABLE C

```
// Server-initiated communication message that is submitted by subsystem to DDBoost Server-
initiated communication Message Queue
typedef struct rpc_server-initiated_msg {
        int msg_type; //ALL_CLIENTS, SPECIFIC_CLIENT
        int stack_id; //connection identifier or 0xffffffff to indicate all clients
    unique_id_t client_id; // client ID or 0xffffffff
        int msg_number; //RPC message number
        union { RPC message data};
};
// RPC message which will travel on the wire from DDBoost Server to DDBoost client
typedef struct rpc_server-initiated_msg {
        int msg_type;
        int msg_number; //RPC message number
        union { RPC message data};
};
```

Figure 26:
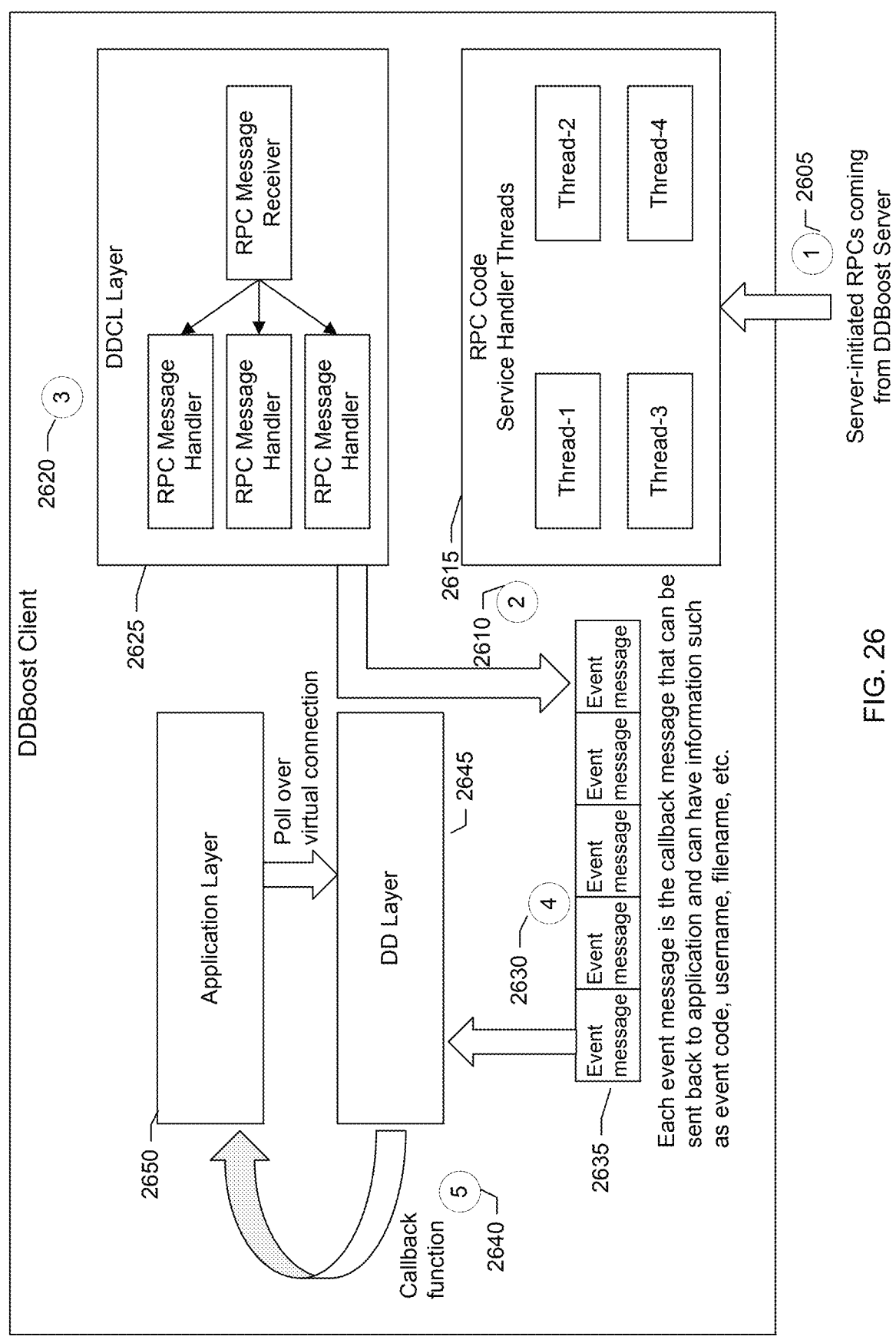
FIG. 26 shows a block diagram of a server-initiated communication connection at a client-side, according to one or more embodiments.

FIG. 26 shows a block diagram illustrating an overview of a DD Boost client-side implementation. In a first step 2605, server-initiated RPC messages are received by an RPC layer on the client-side.

In a second step 2610, DD Boost client-side RPC code receives server-initiated messages from the server. Service handler threads 2615 will start processing them. It is not expected to be receiving hundreds of messages at the same time. So, four or about four RPC threads will be enough to be allocated statically for server-initiated message processing.

In a third step 2620, DDCL layer message handlers 2625 conduct RPC message specific processing. These message handlers are defined per RPC message. And a subsequent processing required for a particular message is performed in the DDCL layer.

In a fourth step 2630, an event queue 2635 holds the events that need to be sent back to the backup applications. Once the DDCL layer message handler processes the server-initiated message, it can determine if this also needs to be notified to the backup applications (e.g., MFR job completion status). In such scenario, it posts a relevant message to the event queue. The DDCL layer also converts server-initiated message data into application specific data such as including connection and user identifier in the event.

In a fifth step 2640, a DD layer 2645 can implement a generic callback message that is called into an application space 2650. This notifies the application that there are events that the application can consume. An application can then poll for the events via a DD Boost API.

In an embodiment, server-initiated communication channel creation is driven via DD Boost clients. This is desirable as the DD Boost client does not need to listen on any port and such a requirement is not practically feasible as customers may not want to open any ports in their environment. This also allows driving server-initiated communication channel creation via a DD Boost API and for an application specific scenario. The DD Boost client can also decide when it wants to create server-initiated communication connection channel or wants to reuse some connection depending on the different application specific environment in which it is working.

The DD Boost client makes a physical TCP connection with the DD Boost server and dedicates that the connection to be used only for server-initiated messages via a technique as described below.

Since the server-initiated channel is per client and per DDR, the connection has to be established during the first physical connection from client to DD and should be closed during the last connection close from client to DD. However, when the connection is established, DD still does not know whether a channel is being used for regular RPCs or for server-initiated communication RPCs. Thus, a new RPC is introduced to indicate the same.

Table D below shows an example of an RPC to indicate establishment of a server-initiated communication channel.

TABLE D

```
#define USE_CONN_AS_SERVER-INITIATED 1
struct dd_conn_type_args_v1 {
    dd_uint32_t rpc_version;
    dd_connection_flag flag;
    string clientid<>; // can be IP address or some client specific name
};
union dd_conn_type_args switch (dd_rpc_version rpc_version) {
    case DD_RPC_VERSION_1:
        dd_conn_type_args_v1 v1;
```

TABLE D-continued

```
    default:
        void;
};
struct dd_conn_type_res_v1_ok {
    dd_uint32_t rpc_version;
};
struct dd_conn_type_res_fail {
    dd_err_t err;
    dd_uint32_t rpc_version;
};
union dd_conn_type_res_v1 switch(nfsstat3 status){
    case NFS3_OK:
        dd_conn_type_res_v1_ok resok;
    default:
        dd_conn_type_res_fail resfail;
};
union dd_conn_type_res switch (dd_rpc_version rpc_version) {
    case DD_RPC_VERSION_1:
        dd_conn_type_res_v1 v1;
    default:
        void;
};
```

In an embodiment, the above RPC is sent during a connection sequence immediately after an authentication sequence completes. In other embodiments, the client can choose to send the new RPC any time. Once the DD Boost server receives this RPC, it allocates resources for the server-initiated communication channel. Once the resources are successfully allocated, the DD Boost server responds back to the client. DD Boost client should be ready to receive RPCs from the DD Boost server at this point. This also means that the DD Boost client should first allocate its own resources before sending the above RPC to DD Boost server.

The DD Boost server can also choose to return a failure should there be cases where insufficient resources are available or any other error scenarios.

Figure 27:
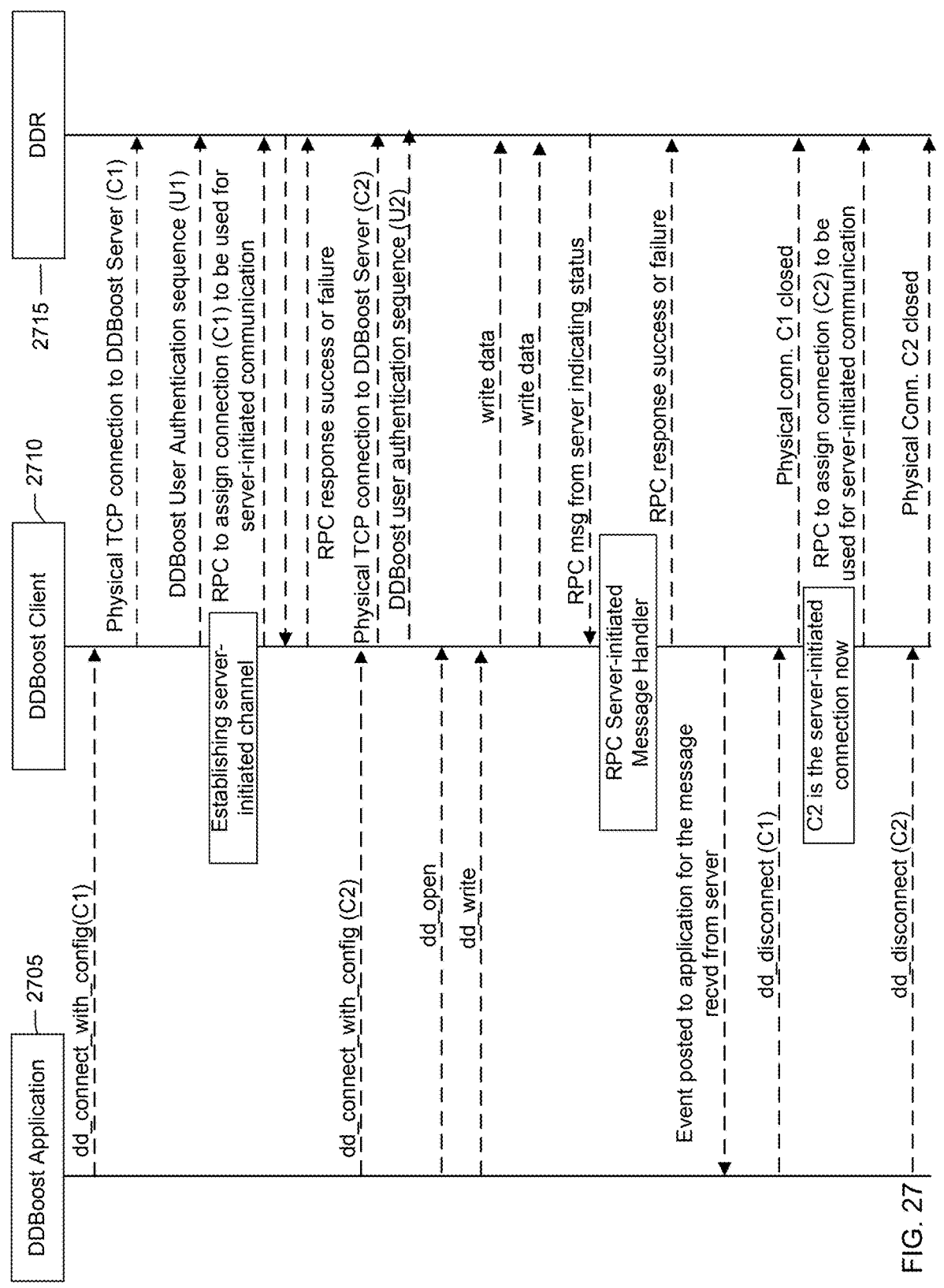
FIG. 27 shows a sequence diagram of a server-initiated communication connection, according to one or more embodiments.

FIG. 27 shows a sequence diagram for server-initiated communication channel connection and disconnection. The sequence of when a server-initiated communication connection is established and destroyed is shown in FIG. 27. The sequence diagram shown in FIG. 27 includes a DD Boost application 2705 (e.g., backup application), a DD Boost client 2710, and a DDR 2715. The DD Boost client manages which connection is used for a server-initiated communication channel connection with each DD Boost server it connects to. It may manage an array or pool of connections identifiers for all the connections to the DD Boost server. It adds an enum/flag to indicate the connection is also used for a server-initiated communication channel.

In case of a connection getting terminated and that connection was also marked for use as a server-initiated communication connection, it will review the established connection pool and find another connection that can now be used as a server-initiated communication connection as part of the termination sequence.

The DD Boost client sends a similar RPC message to indicate a new connection to be used for server-initiated communication channel messages. The DD Boost server does not need to perform any specific actions other than adding the same to the pool of connections it is managing and mark that connection where it should send the server-initiated communication channel messages. DD Boost client ensures that it always sends the same unique client ID for the connection sequence of the same client instance.

In an embodiment, systems and techniques provide for a server-initiated feature toggle. A feature toggle on the DD Boost server side allows for addressing any unforeseeable bug in a customer's environment. When such feature is toggled off, the DD Boost server can return an appropriate error for the RPC as described above.

In an embodiment, systems and techniques provide for multiple connections per client. In an embodiment, the DD Boost client makes multiple connections to the DD Boost server depending on the scenarios. The DD Boost client can use the above mechanism to also dedicate or assign multiple connections as a server-initiated connection. The DD Boost client can choose to make few connections shared for server-initiated communication channel events. This is decided based on the number of "different" users connecting to the server. This can also depend on encryption being used across various connections. The server-initiated communication connection inherits the properties of the original connection being made by an application.

In an embodiment, systems and techniques provide for an RPC transfer mechanism. There can be multiple approaches that can be implemented to send an RPC message from server to client as described in the following. In a first approach, the DD Boost server sends server-initiated message using an RPC or gRPC mechanism. The DD Boost server acts as a client to send out RPC message and the client includes service handlers defined to service the incoming RPC messages. The remaining processing is as shown in FIG. 26 and described in the discussion accompanying FIG. 26.

In a second approach, the client sends RPC messages on the server-side during initialization of connection and will not expect an immediate reply from the server. The server can respond to the messages and when it has a message/event to send back to the client. The client then processes the reply as an incoming message by examining the "data" embedded in there. Once the processing is complete, it posts the new RPC message back to the DD Boost server along with the result of previously posted message. Both client and server can also embed message ID to determine the status.

In an embodiment, a method includes: while receiving file input/output (IO) associated with ingesting one or more files from a client-side deduplication library into a first storage unit at a first data protection appliance, receiving an instruction to migrate the first storage unit to a second data protection appliance; starting synchronizing a second storage unit at the second data protection appliance with the first storage unit; upon reaching a threshold level of synchronization, informing the client-side deduplication library about the migration, the threshold level of synchronization being less than a complete synchronization of the second storage unit with the first storage unit, wherein the client-side deduplication library upon being informed of the migration, closes currently open files of the one or more files to flush pending data to the first storage unit, preserves file and connection descriptors associated with the previously opened but now closed files, and suspends file IO associated with the closed files; and after the suspension of the file IO, completing the synchronization of the second storage unit and notifying the client-side deduplication library of the completion, wherein the client-side deduplication library upon being notified of the completion, reopens the closed files to resume the file IO of the now opened files to the second storage unit and reuses the file and connection descriptors that were preserved for the now opened files.

In an embodiment, a method includes: receiving an instruction to migrate a first storage unit at a first data protection appliance to a second data protection appliance, the instruction being received while receiving file input/output (IO) associated with ingesting one or more files from a client-side deduplication library into the first storage unit; starting synchronizing a second storage unit at the second data protection appliance with the first storage unit; upon reaching a threshold level of synchronization, notifying the client-side deduplication library about the migration, the threshold level of synchronization being less than a complete synchronization of the second storage unit with the first storage unit; closing, by the client-side deduplication library, currently open files of the one or more files to flush pending data to the first storage unit, and suspending the file IO to the first storage unit; after the suspension of the file IO, completing the synchronization of the second storage unit, and notifying the client-side deduplication library of the completion; and reopening, by the client-side deduplication library, the closed files to resume the file IO of the now opened files to the second storage unit.

The method may include: preserving, by the client-side deduplication library, file and connection descriptors associated with the currently open files that are to be closed to flush the pending data; and upon the reopening of the closed files to resume the file IO, reusing the file and connection descriptors that were preserved for the now opened files.

The method may include: blocking file and connection descriptors associated with the currently open files that are to be closed to flush the pending data from being reused for ingesting other files of the one or more files. The method may include: establishing a forechannel connection from the client-side library to the first data protection appliance over which the file IO is sent; and establishing a server-initiated connection from the data protection appliance to the client-side deduplication library over which the notification about the migration is sent.

In an embodiment, the threshold level of synchronization is at least 95 percent.

In an embodiment, notifying the client-side deduplication library of the completion comprises sending, to the client-side deduplication library, an Internet Protocol (IP) address of the second data protection appliance, and an indication that file IO for the first storage unit should be redirected to the second storage unit at the second data protection appliance.

In another embodiment, there is a system comprising: a processor; and memory configured to store one or more sequences of instructions which, when executed by the processor, cause the processor to carry out the steps of: receiving an instruction to migrate a first storage unit at a first data protection appliance to a second data protection appliance, the instruction being received while receiving file input/output (IO) associated with ingesting one or more files from a client-side deduplication library into the first storage unit; starting synchronizing a second storage unit at the second data protection appliance with the first storage unit; upon reaching a threshold level of synchronization, notifying the client-side deduplication library about the migration, the threshold level of synchronization being less than a complete synchronization of the second storage unit with the first storage unit; closing, by the client-side deduplication library, currently open files of the one or more files to flush pending data to the first storage unit, and suspending the file IO to the first storage unit; after the suspension of the file IO, completing the synchronization of the second storage unit, and notifying the client-side deduplication library of the completion; and reopening, by the client-side deduplication library, the closed files to resume the file IO of the now opened files to the second storage unit.

In another embodiment, there is a non-transitory computer-readable medium having a computer-readable program code embodied therein, the computer-readable program code adapted to be executed by one or more processors to implement a method comprising: receiving an instruction to migrate a first storage unit at a first data protection appliance to a second data protection appliance, the instruction being received while receiving file input/output (IO) associated with ingesting one or more files from a client-side deduplication library into the first storage unit; starting synchronizing a second storage unit at the second data protection appliance with the first storage unit; upon reaching a threshold level of synchronization, notifying the client-side deduplication library about the migration, the threshold level of synchronization being less than a complete synchronization of the second storage unit with the first storage unit; closing, by the client-side deduplication library, currently open files of the one or more files to flush pending data to the first storage unit, and suspending the file IO to the first storage unit; after the suspension of the file IO, completing the synchronization of the second storage unit, and notifying the client-side deduplication library of the completion; and reopening, by the client-side deduplication library, the closed files to resume the file IO of the now opened files to the second storage unit.

Figure 28:
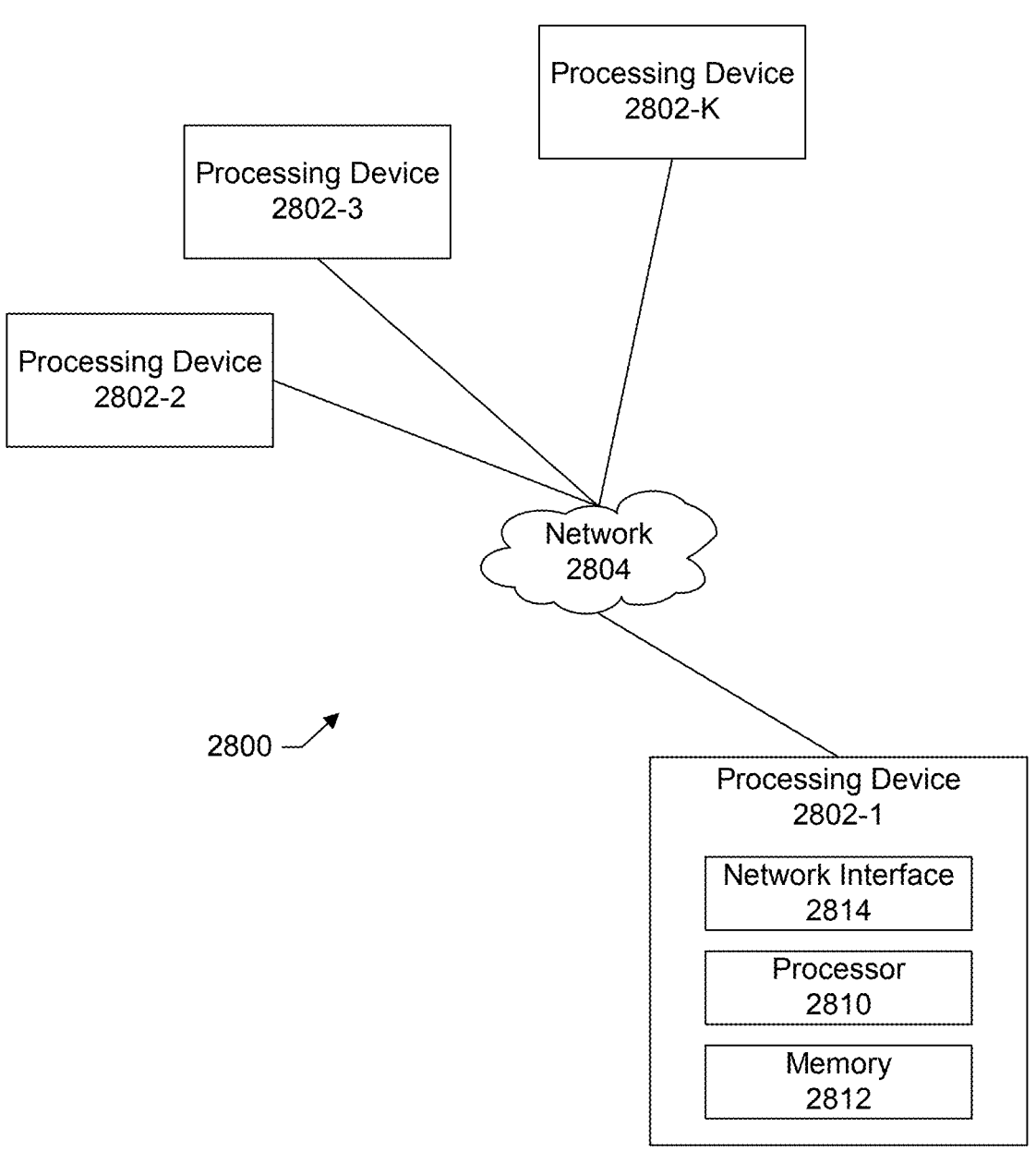
FIG. 28 shows a block diagram of a processing platform that may be utilized to implement at least a portion of an information processing system, according to one or more embodiments.

FIG. 28 shows an example of a processing platform 2800 that may include at least a portion of the information handling system shown in FIG. 1. The example shown in FIG. 28 includes a plurality of processing devices, denoted 2802-1, 2802-2, 2802-3, . . . 2802-K, which communicate with one another over a network 2804.

The network 2804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2802-1 in the processing platform 2800 comprises a processor 2810 coupled to a memory 2812.

The processor 2810 may comprise a microprocessor, a microcontroller, an application-specific integrated circuit (ASIC), a field-programmable gate array (FPGA) or other type of processing circuitry, as well as portions or combinations of such circuitry elements.

The memory 2812 may comprise random access memory (RAM), read-only memory (ROM) or other types of memory, in any combination. The memory 2812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2802-1 is network interface circuitry 2814, which is used to interface the processing device with the network 2804 and other system components, and may comprise conventional transceivers.

The other processing devices 2802 of the processing platform 2800 are assumed to be configured in a manner similar to that shown for processing device 2802-1 in the figure.

Again, the particular processing platform 2800 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 29:
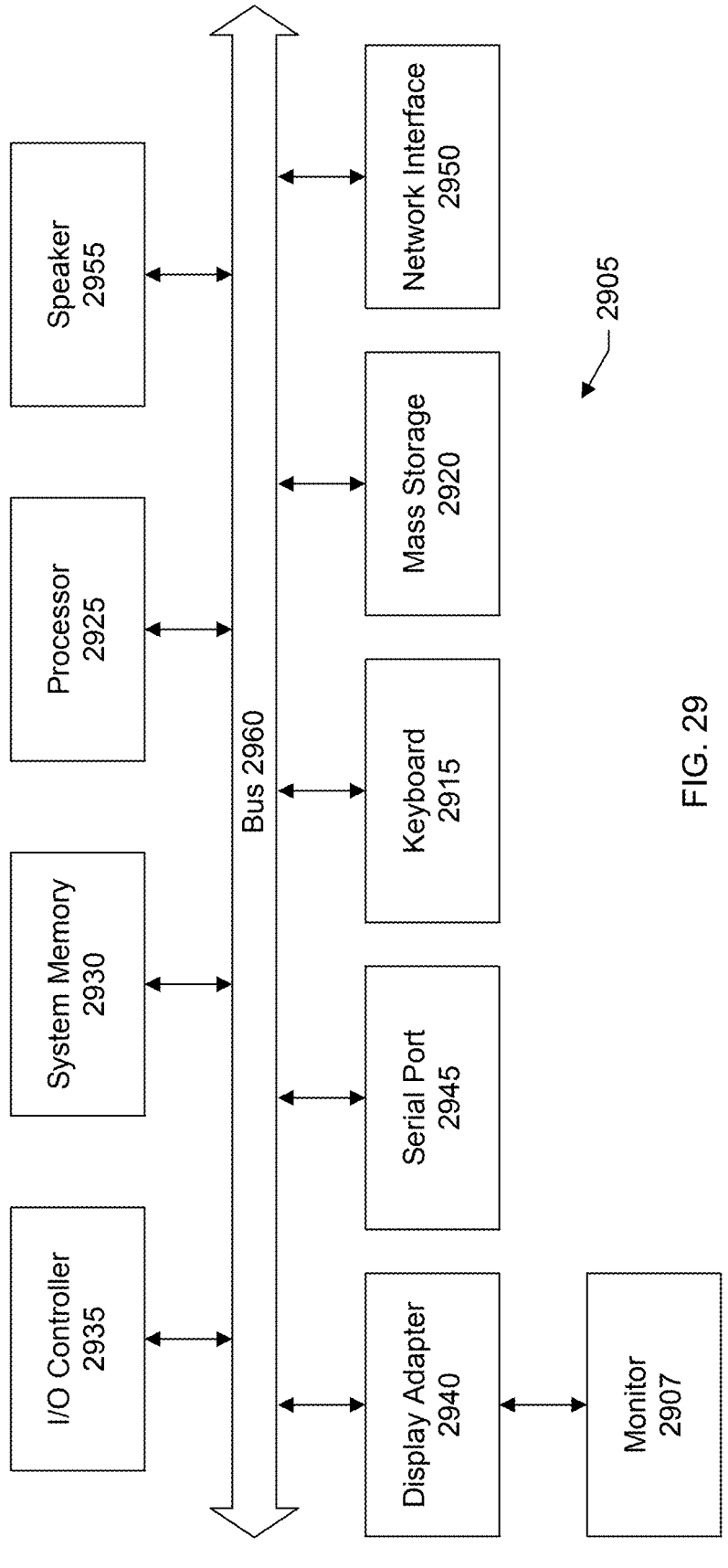
FIG. 29 shows a block diagram of a computer system suitable for use with the system, according to one or more embodiments.

FIG. 29 shows a system block diagram of a computer system 2905 used to execute the software of the present system described herein. The computer system includes a monitor 2907, keyboard 2915, and mass storage devices 2920. Computer system 2905 further includes subsystems such as central processor 2925, system memory 2930, input/output (I/O) controller 2935, display adapter 2940, serial or universal serial bus (USB) port 2945, network interface 2950, and speaker 2955. The system may also be used with computer systems with additional or fewer subsystems. For example, a computer system could include more than one processor 2925 (i.e., a multiprocessor system) or a system may include a cache memory.

Arrows such as 2960 represent the system bus architecture of computer system 2905. However, these arrows are illustrative of any interconnection scheme serving to link the subsystems. For example, speaker 2955 could be connected to the other subsystems through a port or have an internal direct connection to central processor 2925. The processor may include multiple processors or a multicore processor, which may permit parallel processing of information. Computer system 2905 shown in FIG. 29 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:
1. A method comprising:
receiving an instruction to migrate a first storage unit at a first data protection appliance to a second data protection appliance, the instruction being received while receiving file input/output (IO) associated with ingesting one or more files from a client-side deduplication library into the first storage unit;
starting synchronizing a second storage unit at the second data protection appliance with the first storage unit;
upon reaching a threshold level of synchronization, notifying the client-side deduplication library about the migration, the threshold level of synchronization being less than a complete synchronization of the second storage unit with the first storage unit;

closing, by the client-side deduplication library, currently open files of the one or more files to flush pending data to the first storage unit, and suspending the file IO to the first storage unit;
after the suspension of the file IO, completing the synchronization of the second storage unit, and notifying the client-side deduplication library of the completion; and
reopening, by the client-side deduplication library, the closed files to resume the file IO of the now opened files to the second storage unit.
2. The method of claim 1 further comprising:
preserving, by the client-side deduplication library, file and connection descriptors associated with the currently open files that are to be closed to flush the pending data; and
upon the reopening of the closed files to resume the file IO, reusing the file and connection descriptors that were preserved for the now opened files.
3. The method of claim 1 further comprising:
blocking file and connection descriptors associated with the currently open files that are to be closed to flush the pending data from being reused for ingesting other files of the one or more files.
4. The method of claim 1 further comprising:
establishing a forechannel connection from the client-side library to the first data protection appliance over which the file IO is sent; and
establishing a server-initiated connection from the data protection appliance to the client-side deduplication library over which the notification about the migration is sent.
5. The method of claim 1 wherein the threshold level of synchronization is at least 95 percent.
6. The method of claim 1 wherein the notifying the client-side deduplication library of the completion comprises sending, to the client-side deduplication library, an Internet Protocol (IP) address of the second data protection appliance, and an indication that file IO for the first storage unit should be redirected to the second storage unit at the second data protection appliance.
7. A system comprising: a processor; and memory configured to store one or more sequences of instructions which, when executed by the processor, cause the processor to carry out the steps of:
receiving an instruction to migrate a first storage unit at a first data protection appliance to a second data protection appliance, the instruction being received while receiving file input/output (IO) associated with ingesting one or more files from a client-side deduplication library into the first storage unit;
starting synchronizing a second storage unit at the second data protection appliance with the first storage unit;
upon reaching a threshold level of synchronization, notifying the client-side deduplication library about the migration, the threshold level of synchronization being less than a complete synchronization of the second storage unit with the first storage unit;
closing, by the client-side deduplication library, currently open files of the one or more files to flush pending data to the first storage unit, and suspending the file IO to the first storage unit;
after the suspension of the file IO, completing the synchronization of the second storage unit, and notifying the client-side deduplication library of the completion; and reopening, by the client-side deduplication library, the closed files to resume the file IO of the now opened files to the second storage unit.

8. The system of claim 7 wherein the processor further carries out the steps of:

preserving, by the client-side deduplication library, file and connection descriptors associated with the currently open files that are to be closed to flush the pending data; and upon the reopening of the closed files to resume the file IO, reusing the file and connection descriptors that were preserved for the now opened files.

9. The system of claim 7 wherein the processor further carries out the steps of:

blocking file and connection descriptors associated with the currently open files that are to be closed to flush the pending data from being reused for ingesting other files of the one or more files.

10. The system of claim 7 wherein the processor further carries out the steps of:

establishing a forechannel connection from the client-side library to the first data protection appliance over which the file IO is sent; and establishing a server-initiated connection from the data protection appliance to the client-side deduplication library over which the notification about the migration is sent.

11. The system of claim 7 wherein the threshold level of synchronization is at least 95 percent.

12. The system of claim 7 wherein the notifying the client-side deduplication library of the completion comprises sending, to the client-side deduplication library, an Internet Protocol (IP) address of the second data protection appliance, and an indication that file IO for the first storage unit should be redirected to the second storage unit at the second data protection appliance.

13. A computer program product, comprising a non-transitory computer-readable medium having a computer-readable program code embodied therein, the computer-readable program code adapted to be executed by one or more processors to implement a method comprising:

receiving an instruction to migrate a first storage unit at a first data protection appliance to a second data protection appliance, the instruction being received while receiving file input/output (IO) associated with ingesting one or more files from a client-side deduplication library into the first storage unit;

starting synchronizing a second storage unit at the second data protection appliance with the first storage unit;

upon reaching a threshold level of synchronization, notifying the client-side deduplication library about the migration, the threshold level of synchronization being less than a complete synchronization of the second storage unit with the first storage unit;

closing, by the client-side deduplication library, currently open files of the one or more files to flush pending data to the first storage unit, and suspending the file IO to the first storage unit;

after the suspension of the file IO, completing the synchronization of the second storage unit, and notifying the client-side deduplication library of the completion; and reopening, by the client-side deduplication library, the closed files to resume the file IO of the now opened files to the second storage unit.

14. The computer program product of claim 13 wherein the method further comprises:

preserving, by the client-side deduplication library, file and connection descriptors associated with the currently open files that are to be closed to flush the pending data; and upon the reopening of the closed files to resume the file IO, reusing the file and connection descriptors that were preserved for the now opened files.

15. The computer program product of claim 13 wherein the method further comprises:

blocking file and connection descriptors associated with the currently open files that are to be closed to flush the pending data from being reused for ingesting other files of the one or more files.

16. The computer program product of claim 13 wherein the method further comprises:

establishing a forechannel connection from the client-side library to the first data protection appliance over which the file IO is sent; and establishing a server-initiated connection from the data protection appliance to the client-side deduplication library over which the notification about the migration is sent.

17. The computer program product of claim 13 wherein the threshold level of synchronization is at least 95 percent.

18. The computer program product of claim 13 wherein the notifying the client-side deduplication library of the completion comprises sending, to the client-side deduplication library, an Internet Protocol (IP) address of the second data protection appliance, and an indication that file IO for the first storage unit should be redirected to the second storage unit at the second data protection appliance.

* * * * *